(12) United States Patent
   Galvin

(10) Patent No.: US 12,664,440 B2
(45) Date of Patent: Jun. 23, 2026

(54) SYSTEM AND METHOD FOR A LARGE CODEWORD MODEL FOR DEEP LEARNING

(71) Applicant: AtomBeam Technologies Inc., Moraga, CA (US)

(72) Inventor: Brian Galvin, Silverdale, WA (US)

(73) Assignee: ATOMBEAM TECHNOLOGIES INC., Moraga, CA (US)

( * ) Notice: Subject to any disclaimer, the term of this patent is extended or adjusted under 35 U.S.C. 154(b) by 0 days.

(21) Appl. No.: 18/914,257

(22) Filed: Oct. 13, 2024

(65) Prior Publication Data

US 2025/0363385 A1 Nov. 27, 2025

Related U.S. Application Data

(63) Continuation-in-part of application No. 18/736,498, filed on Jun. 6, 2024.

(Continued)

(51) Int. Cl.
   *G06N 3/096* (2023.01)
   *G06F 18/23* (2023.01)
   (Continued)

(52) U.S. Cl.
   CPC ............. *G06N 3/096* (2023.01); *G06F 18/23* (2023.01); *G06N 3/044* (2023.01); *G06N 3/0455* (2023.01)

(58) Field of Classification Search
   CPC ...... G06N 3/096; G06N 3/044; G06N 3/0455; G06F 18/23
   See application file for complete search history.

(56) References Cited

U.S. PATENT DOCUMENTS

| | | | |
|---|---|---|---|
| 4,780,718 A | 10/1988 | Hudson et al. | |
| 5,708,436 A | 1/1998 | Loiz et al. | |

(Continued)

FOREIGN PATENT DOCUMENTS

| | | |
|---|---|---|
| EP | 3364212 A1 | 8/2018 |
| GB | 2620921 A | 1/2024 |
| WO | 2020104416 A1 | 5/2020 |

OTHER PUBLICATIONS

Bordes, Patrick. "Deep Multimodal Learning for Joint Textual and Visual Reasoning" (Year: 2020).*
Vaswani, Ashish, et al. "Attention is all you need." (Year: 2017).*
Caglayan, et al., "Multimodal attention for neural machine translation." (Year: 2016).*
Sulubacak, et al., "Multimodal machine translation through visuals and speech." (Year: 2020).*

(Continued)

*Primary Examiner* — Ryan Barrett
*Assistant Examiner* — Matiyas T Maru
(74) *Attorney, Agent, or Firm* — GALVIN PATENT LAW LLC; Brian R. Galvin; Erin L. Johnston

(57) ABSTRACT

Modality agnostic Large Codeword Model ("LCM") is an advanced deep learning architecture that processes discrete, compressed data representations called codewords across multiple modalities. Unlike traditional models using raw tokens and dense embeddings, LCMs efficiently handle diverse input types including text, images, audio, and video. The system employs a modality agnostic encoder, unified codebook, and multimodal machine learning core to capture inherent data structures and patterns. This approach enables more generalizable and interpretable feature learning, facilitating transfer learning across domains. The LCM's scalable and flexible architecture includes components for modality-specific processing, cross-modal attention, and joint representation learning. With its computational efficiency and versatility, the Modality Agnostic LCM offers significant potential for various AI applications, including natural language processing, computer vision, and multimodal reasoning.

24 Claims, 20 Drawing Sheets

Related U.S. Application Data

(60) Provisional application No. 63/651,359, filed on May 23, 2024.

(51) Int. Cl.
    *G06N 3/044*       (2023.01)
    *G06N 3/0455*     (2023.01)

(56) References Cited

U.S. PATENT DOCUMENTS

| | | | |
|---|---|---|---|
| 7,411,540 B1 | 8/2008 | Lopez et al. | |
| 7,629,922 B2 | 12/2009 | Winstead et al. | |
| 7,876,257 B2 | 1/2011 | Vetro et al. | |
| 9,524,392 B2 | 12/2016 | Naehrig et al. | |
| 10,789,427 B2 * | 9/2020 | Shazeer | G06N 3/045 |
| 11,451,242 B2 | 9/2022 | Choi et al. | |
| 11,656,353 B2 | 5/2023 | Li et al. | |
| 2004/0017307 A1 | 1/2004 | Cirillo et al. | |
| 2004/0160353 A1 | 8/2004 | Cirillo et al. | |
| 2008/0231504 A1 | 9/2008 | Sartor et al. | |
| 2011/0012778 A1 | 1/2011 | Nguyen et al. | |
| 2015/0054678 A1 | 2/2015 | Wakayama | |
| 2017/0048537 A1 | 2/2017 | Boufounos et al. | |
| 2018/0196609 A1 | 7/2018 | Niesen | |
| 2019/0140658 A1 * | 5/2019 | Cooper | H03M 7/4012 |
| 2020/0258296 A1 | 8/2020 | Pennings et al. | |
| 2020/0395955 A1 | 12/2020 | Choi et al. | |
| 2021/0390269 A1 * | 12/2021 | Rezagholizadeh | G06F 40/58 |
| 2022/0156631 A1 | 5/2022 | Kanso et al. | |
| 2022/0404490 A1 | 12/2022 | Evans et al. | |
| 2023/0131694 A1 | 4/2023 | Saber et al. | |
| 2023/0169623 A1 | 6/2023 | Chen et al. | |
| 2023/0184927 A1 | 6/2023 | Chen et al. | |
| 2024/0152695 A1 * | 5/2024 | Shukla | G06F 40/186 |
| 2024/0185037 A1 | 6/2024 | Park et al. | |
| 2024/0195438 A1 | 6/2024 | Isik et al. | |
| 2025/0103886 A1 * | 3/2025 | Norouzzadeh | G06N 3/10 |

OTHER PUBLICATIONS

Wang, "T-CVAE: Transformer-based conditioned variational autoencoder for story completion." (Year: 2019).*

Duan, et al., "Multi-modal alignment using representation codebook." (Year: 2022).*

Yu, et al., "Multi-scale multi-modal dictionary BERT for effective text-image retrieval in multimedia advertising." (Year: 2022).*

Dabre et al., "A survey of multilingual neural machine translation." (Year: 2020).*

Sennrich, et al., "Linguistic input features improve neural machine translation." (Year: 2016).*

Du, et al., "Pinyin as subword unit for chinese-sourced neural machine translation." (Year: 2017).*

Bordes et al., "Deep Multimodal Learning for Joint Textual and Visual Reasoning". (Year: 2020).*

Khan et al., "Coding textual inputs boosts the accuracy of neural networks" (Year: 2020).*

Balaneshin-Kordan, "Deep Neural Architecture for Multi-Modal Retrieval based on Joint Embedding Space for Text and Images", WSDM '18, p. 28-36.

Khan, "Coding Textual Inputs Boosts the Accuracy of Neural Networks", Proceedings of the 2020 Conference on Empirical Methods in Natural Language Processing, 2020, p. 1350-1360.

Messina, "Towards Efficient Cross-Modal Visual Textual Retrieval using Transformer-Encoder Deep Features", IEEE Xplore, 2024.

Seo, "How Does a Transformer Learn Compression? An Attention Study on Huffman and LZ4", IEEE Access, 2023.

Vaswani, "Attention Is All You Need", 31st Conference on Neural Information Processing Systems, 2017.

Wang, "T-CVAE: Transformer-Based Conditioned Variational Autoencoder for Story Completion", JJCAI-19, p. 5233-5239.

Wieting et al, "A Bilingual Generative Transformer for Semantic Sentence Embedding", 2020.

* cited by examiner

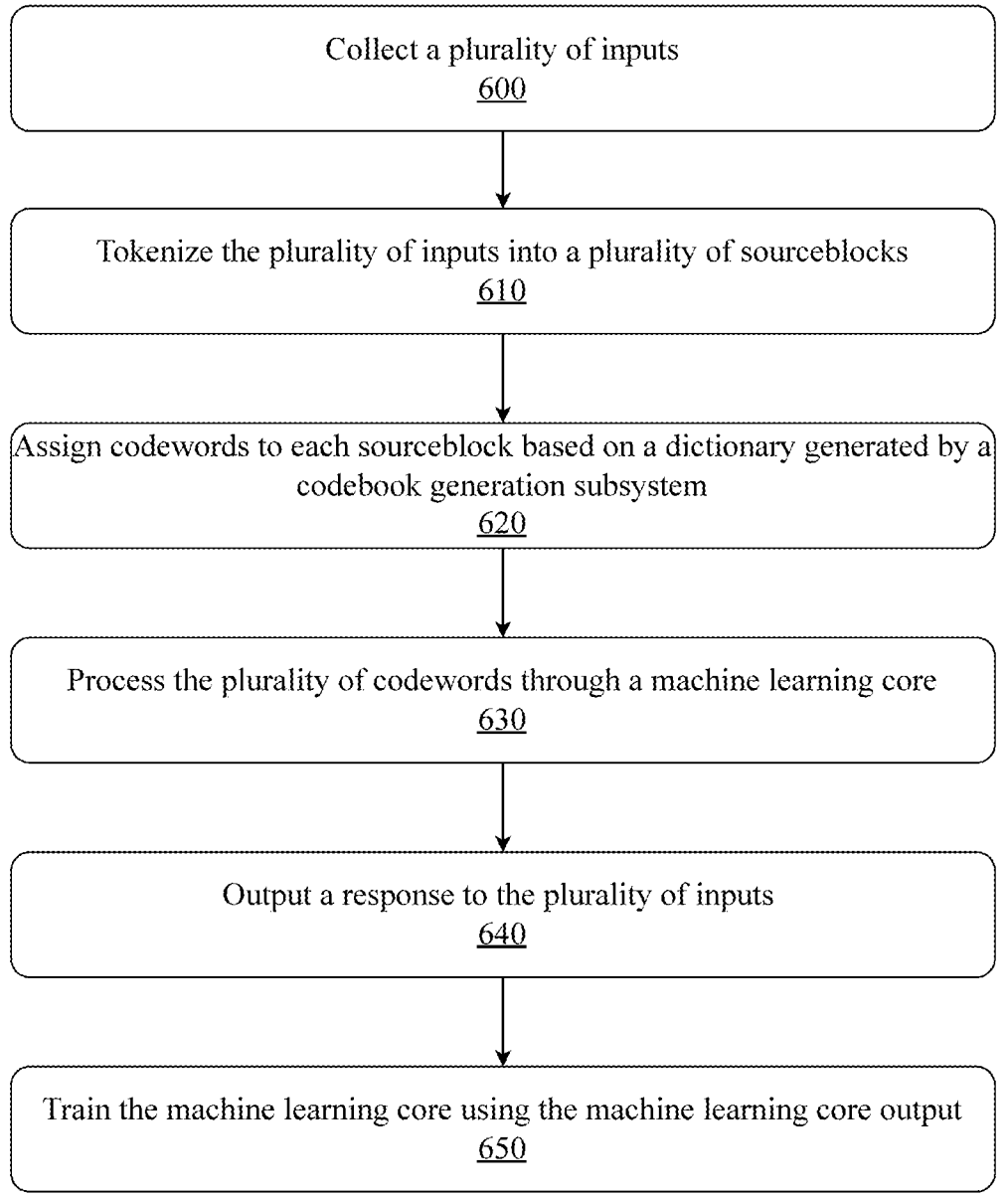

Collect a plurality of inputs
600

Tokenize the plurality of inputs into a plurality of sourceblocks
610

Assign codewords to each sourceblock based on a dictionary generated by a codebook generation subsystem
620

Process the plurality of codewords through a machine learning core
630

Output a response to the plurality of inputs
640

Train the machine learning core using the machine learning core output
650

Fig. 6

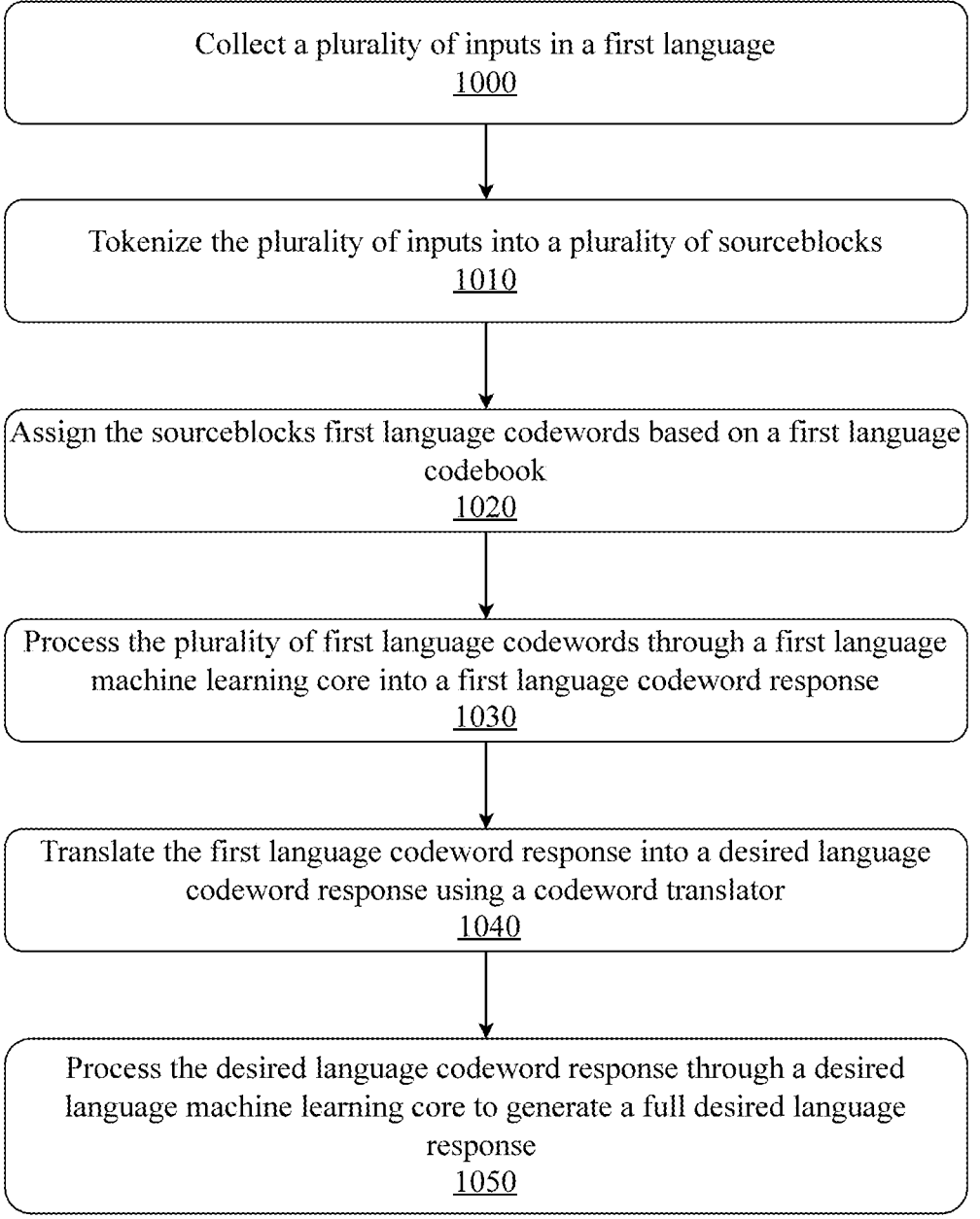

Collect a plurality of inputs in a first language
1000

Tokenize the plurality of inputs into a plurality of sourceblocks
1010

Assign the sourceblocks first language codewords based on a first language codebook
1020

Process the plurality of first language codewords through a first language machine learning core into a first language codeword response
1030

Translate the first language codeword response into a desired language codeword response using a codeword translator
1040

Process the desired language codeword response through a desired language machine learning core to generate a full desired language response
1050

Fig. 10

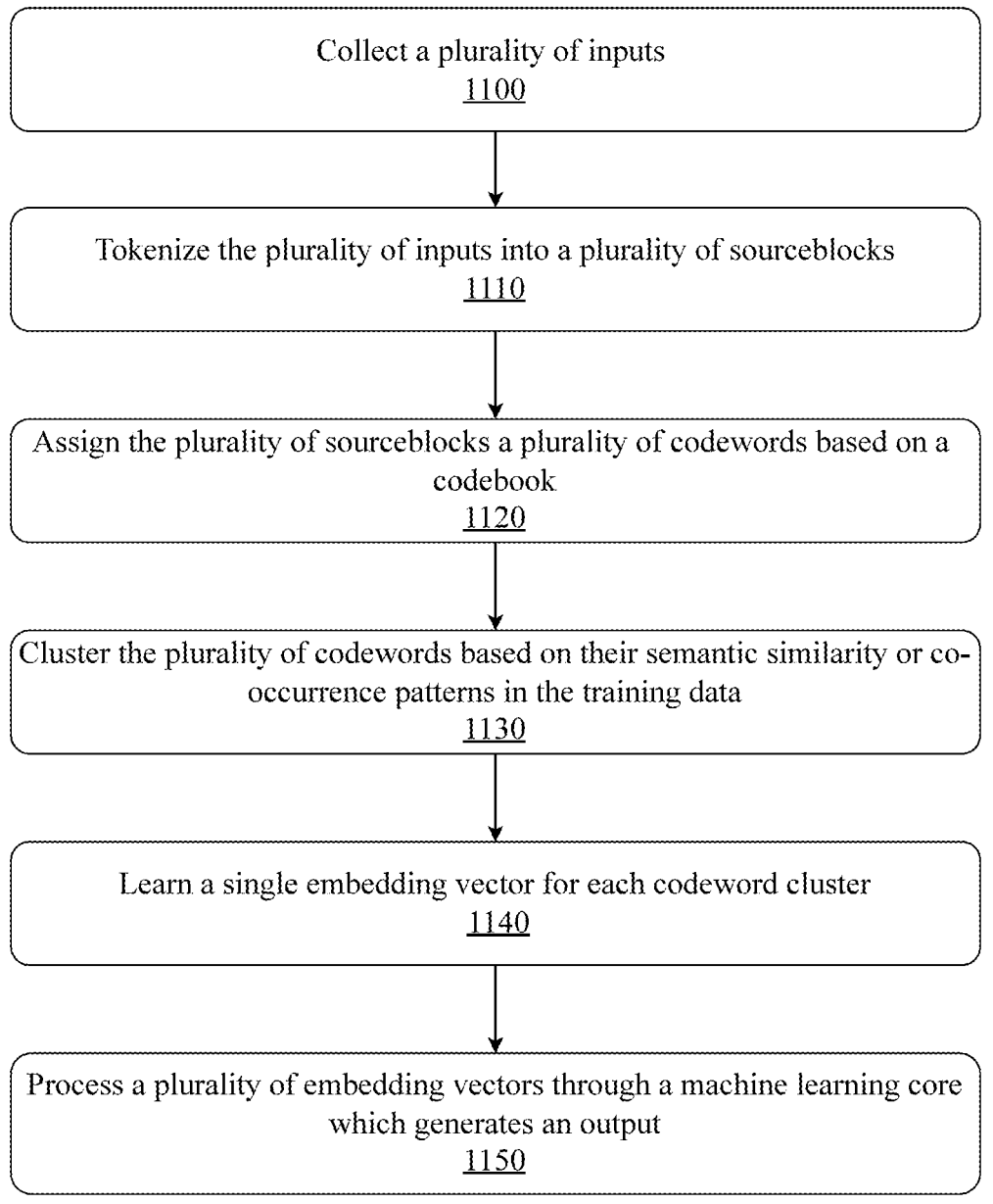

Collect a plurality of inputs
1100

Tokenize the plurality of inputs into a plurality of sourceblocks
1110

Assign the plurality of sourceblocks a plurality of codewords based on a
codebook
1120

Cluster the plurality of codewords based on their semantic similarity or co-
occurrence patterns in the training data
1130

Learn a single embedding vector for each codeword cluster
1140

Process a plurality of embedding vectors through a machine learning core
which generates an output
1150

Fig. 11

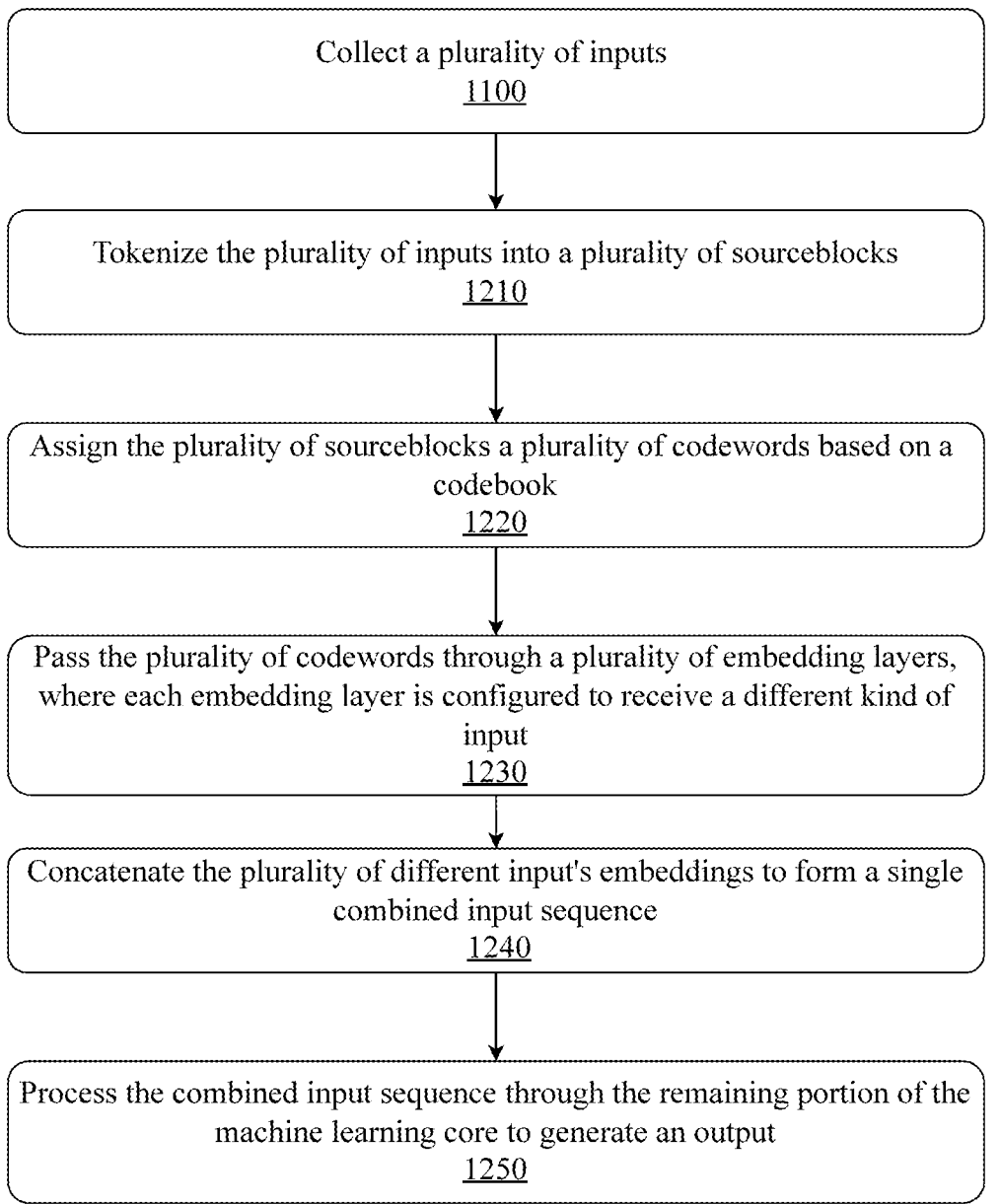

Collect a plurality of inputs
1100

Tokenize the plurality of inputs into a plurality of sourceblocks
1210

Assign the plurality of sourceblocks a plurality of codewords based on a codebook
1220

Pass the plurality of codewords through a plurality of embedding layers, where each embedding layer is configured to receive a different kind of input
1230

Concatenate the plurality of different input's embeddings to form a single combined input sequence
1240

Process the combined input sequence through the remaining portion of the machine learning core to generate an output
1250

Fig. 12

Modality Agnostic Encoder
1400

1301

Data Sorting and
Routing
1410

Text Input
1411

Image Input
1412

Audio Input
1413

Video Input
1414

1420

Bidirectional
LTSM
Network
1421

Res CNN
1422

CRNN
1423

3D CNN
1424

1430

Feature Alignment
1431

Cross-Modal Attention
1432

Feature Concatenation
1433

Multi-Modal Transformer
1434

Dimensionality Reduction
1435

Normalization
1436

1440

Multimodal Machine Learning Core
1500

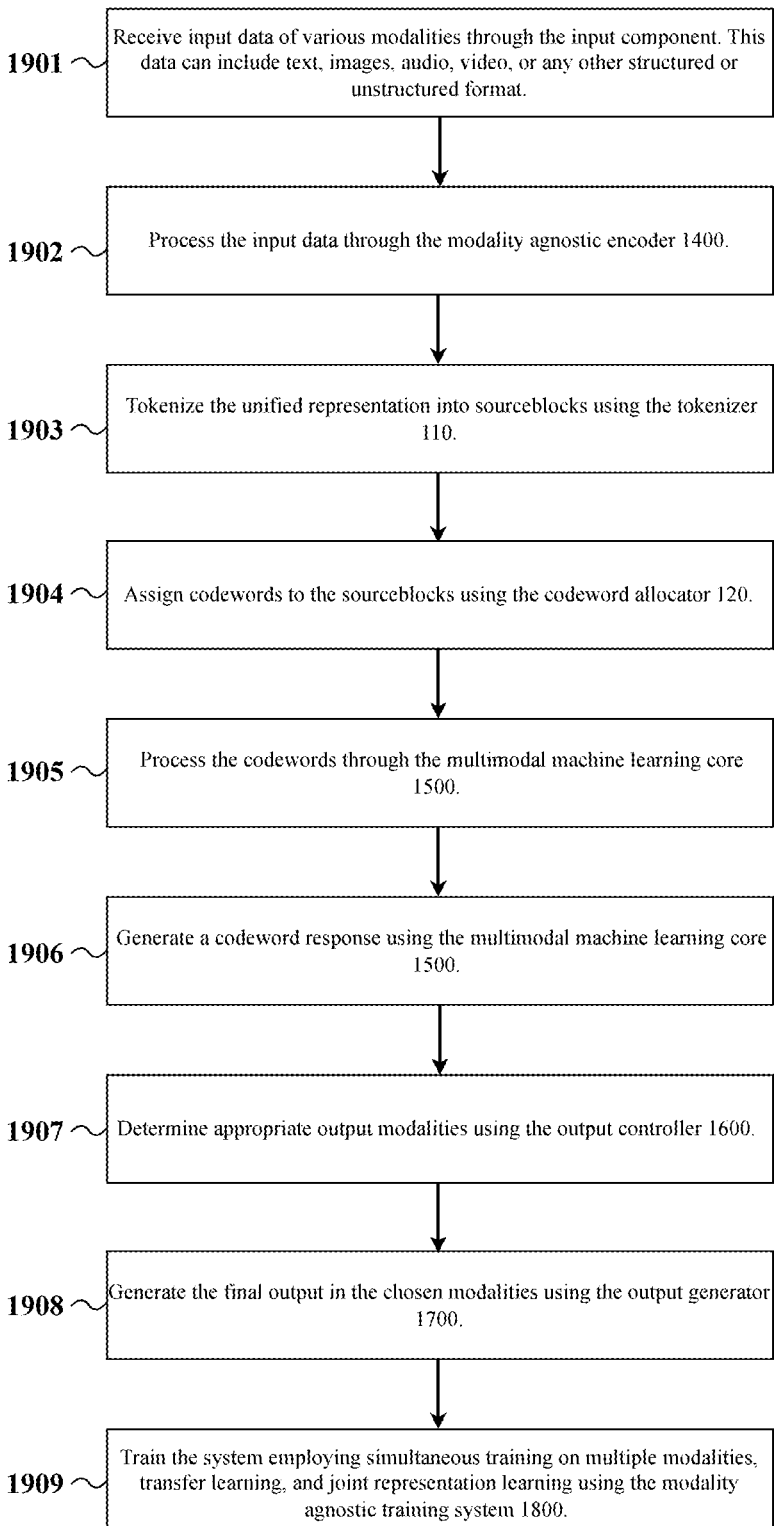

1901 — Receive input data of various modalities through the input component. This data can include text, images, audio, video, or any other structured or unstructured format.

1902 — Process the input data through the modality agnostic encoder 1400.

1903 — Tokenize the unified representation into sourceblocks using the tokenizer 110.

1904 — Assign codewords to the sourceblocks using the codeword allocator 120.

1905 — Process the codewords through the multimodal machine learning core 1500.

1906 — Generate a codeword response using the multimodal machine learning core 1500.

1907 — Determine appropriate output modalities using the output controller 1600.

1908 — Generate the final output in the chosen modalities using the output generator 1700.

1909 — Train the system employing simultaneous training on multiple modalities, transfer learning, and joint representation learning using the modality agnostic training system 1800.

Fig. 19

SYSTEM AND METHOD FOR A LARGE CODEWORD MODEL FOR DEEP LEARNING

CROSS-REFERENCE TO RELATED APPLICATIONS

Priority is claimed in the application data sheet to the following patents or patent applications, each of which is expressly incorporated herein by reference in its entirety:

Ser. No. 18/736,498
63/651,359

BACKGROUND OF THE INVENTION

Field of the Art

The present invention relates to the field of artificial intelligence and machine learning, and more specifically to deep learning models for processing and generating data such as text, images, audio, and other modalities.

Discussion of the State of the Art

In recent years, deep learning models have achieved remarkable success in various domains, including natural language processing, computer vision, and speech recognition. One of the most prominent architectures in this field is the Transformer model, which has been the basis for state-of-the-art language models like BERT, GPT, and their successors.

These language models typically operate on a sequence of input tokens, which are often derived by splitting the input text into words or subwords. Each token is then mapped to a dense vector representation, known as an embedding, which captures semantic and syntactic information about the token. In many deep learning models, a transformer architecture processes these embeddings using self-attention mechanisms and feedforward neural networks to generate contextualized representations and outputs.

However, this token-based approach has several limitations. The tokenization process can be complex and may not always align with the inherent structure of the data. In many networks, the use of dense embeddings can be computationally expensive and memory-intensive, especially for large vocabularies. Additionally, the learned representations are specific to the language and domain of the training data, which can limit the model's ability to generalize to new languages or domains.

What is needed is a new neural network model that can operate at a higher level of abstraction, using more compact and expressive representations that can efficiently capture the underlying patterns in the data. It should be flexible enough to handle various data modalities beyond just text, and should enable seamless transfer learning across different languages and domains.

SUMMARY OF THE INVENTION

Accordingly, the inventor has conceived and reduced to practice a system and method for a generic compound large codeword model for natively multimodal deep learning. The generic compound large codeword model (LCM) aims to address the limitations of current approaches and unlock new possibilities for AI systems. Unlike traditional models that operate on raw tokens, LCMs work with codewords— discrete, compressed representations of the input data from multiple modalities that capture their inherent structure and patterns. This allows LCMs to process and generate multimodal data more efficiently, using fewer computational resources and less memory. Moreover, LCMs are highly versatile and can be applied to various data modalities simultaneously, including text, images, audio, and video. They can also be combined in hierarchical or federated architectures to tackle complex problems and enable transfer learning across different domains and modalities. By operating at a higher level of abstraction and using more expressive unified representations, LCMs can learn more generalizable and interpretable features across modalities, making them suitable for a wide range of applications. This includes but is not limited to multimodal natural language processing, cross-modal speech recognition, multimodal recommendation systems, and many others.

According to a preferred embodiment, a system for a generic compound large codeword model for natively multimodal deep learning, comprising one or more computers with executable instructions that, when executed, cause the system to: receive a plurality of inputs of different modalities; tokenize the plurality of inputs into a plurality of sourceblocks; assign the plurality of sourceblocks a plurality of codewords, where each sourceblock is mapped to a particular codeword through a unified codebook; process the plurality of codewords through a multimodal machine learning core; generate a codeword response to the plurality of inputs using the multimodal machine learning core; translate the codeword response into a translated response which matches one or more modalities of the inputs; and train the multimodal machine learning core using the translated response and a plurality of multimodal training data, is disclosed.

According to another preferred embodiment, a method for a generic compound large codeword model for natively multimodal deep learning, comprising the steps of: receiving a plurality of inputs of different modalities; tokenizing the plurality of inputs into a plurality of sourceblocks; assigning the plurality of sourceblocks a plurality of codewords, where each sourceblock is mapped to a particular codeword through a unified codebook; processing the plurality of codewords through a multimodal machine learning core; generating a codeword response to the plurality of inputs using the multimodal machine learning core; translating the codeword response into a translated response which matches one or more modalities of the inputs; and training the multimodal machine learning core using the translated response and a plurality of multimodal training data, is disclosed.

According to an aspect of an embodiment, the multimodal machine learning core has a transformer-based machine learning architecture.

According to an aspect of an embodiment, the multimodal machine learning core has a variational autoencoder-based machine learning architecture.

According to an aspect of an embodiment, the multimodal machine learning core has a recurrent neural network-based machine learning architecture.

According to an aspect of an embodiment, the system and method further comprise a plurality of unified codebooks and a plurality of multimodal machine learning cores, wherein each unified codebook and multimodal machine learning core is configured to process inputs of different modalities.

According to an aspect of an embodiment, the system and method further comprise a codeword translator which translates codewords between any plurality of modalities.

According to an aspect of an embodiment, the multimodal machine learning core comprises a unified embedding layer capable of embedding inputs from multiple modalities into a shared latent space.

According to an aspect of an embodiment, the system and method further comprise a codeword clustering component which clusters codewords prior to being processed by the multimodal machine learning core.

According to an aspect of an embodiment, the plurality of inputs comprises at least two of: text data, image data, audio data, and video data.

According to an aspect of an embodiment, the multimodal machine learning core comprises a cross-modal attention mechanism capable of attending to information across different modalities.

According to an aspect of an embodiment, the system and method further comprise a modality-agnostic encoder that converts inputs from different modalities into a unified codeword representation.

According to an aspect of an embodiment, the system and method are configured to perform transfer learning between different modalities using the unified codeword representation.

According to an aspect of an embodiment, the multimodal machine learning core is trained simultaneously on multiple modalities to learn joint representations.

According to an aspect of an embodiment, the system and method are configured to generate outputs in multiple modalities based on a single codeword response.

BRIEF DESCRIPTION OF THE DRAWING FIGURES

FIG. 6 is a flow diagram illustrating an exemplary method for a large codeword model for deep learning.

FIG. 10 is a flow diagram illustrating an exemplary method for language translation using a large codeword model for deep learning.

FIG. 11 is a flow diagram illustrating an exemplary method for codeword clustering using a large codeword model.

FIG. 12 is a flow diagram illustrating an exemplary method for a large codeword model for deep learning using a dual embedding layer.

FIG. 19 is a method diagram illustrating the use of modality agnostic LCM for deep learning.

DETAILED DESCRIPTION OF THE INVENTION

Figure 1:
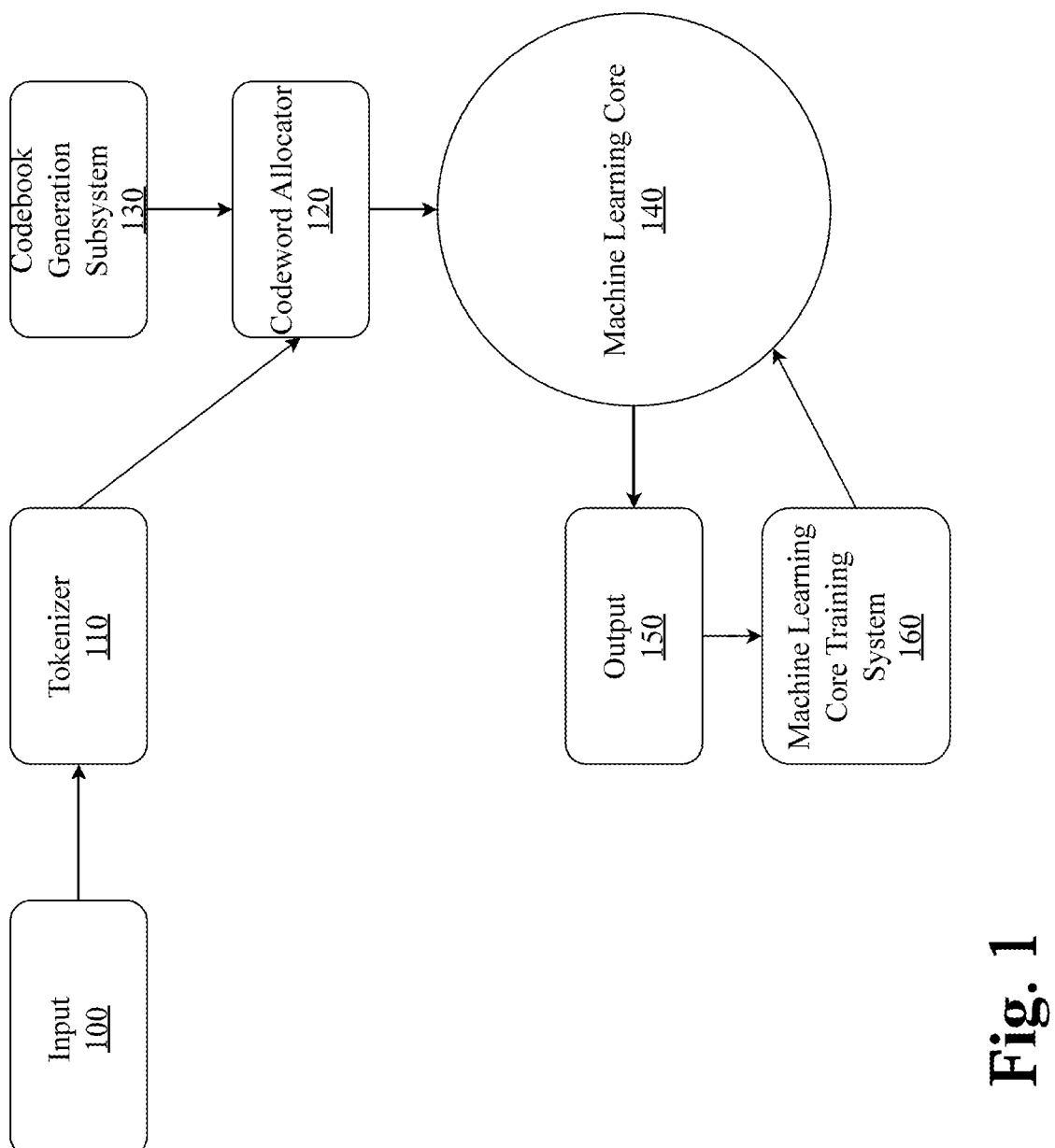
FIG. 1 is a block diagram illustrating an exemplary system architecture for a large codeword model for deep learning.

The inventor has conceived, and reduced to practice, generic compound large codeword model (LCM) for natively multimodal deep learning. Unlike traditional deep learning models that operate on raw tokens and dense embeddings, LCMs work with discrete, compressed representations called codewords across multiple modalities. The LCM architecture consists of a multimodal tokenizer that splits the input data from various modalities into meaningful semantic units called sourceblocks, a unified codebook generation subsystem that assigns unique codewords to each sourceblock regardless of its original modality, and a codeword allocator that maps the sourceblocks to their corresponding codewords within a shared codeword space. The codewords are then processed by a multimodal machine learning core, which can be implemented using various architectures such as Transformers, Variational Autoencoders (VAEs), or a combination of different models. The multimodal machine learning core learns to capture patterns, relationships, and semantics within and across the codeword sequences from different modalities, enabling efficient and effective processing and generation of multimodal data.

Generic compound LCM's architecture is inherently flexible and adaptable to different data modalities and tasks. It natively handles multiple input types simultaneously by incorporating a unified embedding layer that embeds inputs from multiple modalities into a shared latent space. This unified representation allows for seamless processing and interaction between different modalities. Additionally, LCMs can be used for cross-modal translation by employing a codeword translator that maps codewords between different modalities. The LCM architecture also supports cross-modal attention mechanisms, allowing the model to attend to information across different modalities. Furthermore, the architecture incorporates a modality-agnostic encoder that converts inputs from different modalities into a unified codeword representation, facilitating transfer learning between different modalities. The LCM can be trained simultaneously on multiple modalities to learn joint representations, enabling it to generate outputs in multiple modalities based on a single codeword response. The architecture also supports codeword clustering, where semantically similar or co-occurring codewords across modalities are grouped together, and embeddings are learned for each cluster instead of individual codewords. This approach reduces the dimensionality of the embedding space and enables more efficient and meaningful representations across modalities. Overall, generic compound LCM presents a powerful and versatile framework for natively multimodal deep learning that can be applied to a wide range of domains, offering benefits such as improved efficiency, scalability, and adaptability compared to traditional deep learning approaches.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

As used herein, "sourceblock" to a semantically meaningful unit of text that is derived from the input data through a process called syntactic splitting. Syntactic splitting involves breaking down the input text into smaller chunks along syntactic boundaries, such as those between words or tokens. These resulting chunks, or sourceblocks, serve as the basic units of representation in LCMs, replacing the traditional word or subword tokens used in Large Language Models (LLMs). Each sourceblock is then assigned a unique codeword from a codebook, which allows for efficient compression and processing of the text data. By preserving syntactic and semantic information within sourceblocks, LCMs aim to capture the inherent structure and meaning of the language more effectively while achieving higher compression ratios compared to LLMs.

As used herein, "machine learning core" refers to the central component responsible for processing and learning from the codeword representations derived from the input data. This core can consist of one or more machine learning architectures, working individually or in combination, to capture the patterns, relationships, and semantics within the codeword sequences. Some common architectures that can be employed in the machine learning core of LCMs include but are not limited to transformers, variational autoencoders (VAEs), recurrent neural networks (RNNs), convolutional neural networks (CNNs), and attention mechanisms. These architectures can be adapted to operate directly on the codeword representations, with or without the need for traditional dense embedding layers. The machine learning core learns to map input codeword sequences to output codeword sequences, enabling tasks such as language modeling, text generation, and classification. By leveraging the compressed and semantically rich codeword representations, the machine learning core of LCMs can potentially achieve more efficient and effective learning compared to traditional token-based models. The specific choice and configuration of the machine learning architectures in the core can be tailored to the characteristics of the input data and the desired output tasks, allowing for flexibility and adaptability in the design of LCMs.

Conceptual Architecture

FIG. 1 is a block diagram illustrating an exemplary system architecture for a large codeword model for deep learning. An input 100 represents the raw data that needs to be processed by the LCM. This data can be in various modalities, such as text, images, audio, time series, or any other structured or unstructured format. The input data is fed into the tokenizer 110 for further processing.

A tokenizer 110 is responsible for splitting the input data into meaningful semantic units called sourceblocks. This process, known as semantic splitting, aims to capture the inherent structure and patterns in the data. The tokenizer can employ various techniques to identify the optimal sourceblocks, such as rule-based splitting, statistical methods, or machine learning approaches. For textual data, the tokenizer may use subword tokenization methods like Byte-Pair Encoding (BPE) or WordPiece, which break down words into smaller, more frequently occurring units. For images, the tokenizer may use approaches such as but not limited to a patch-approach, where the image is divided into fixed-size patches or regions. The specific tokenization method can be chosen based on the data modality and the characteristics of the domain. For example, the first paragraph of Leo Tolstoy's War and Peace which reads, "Well, Prince, so Genoa and Lucca are now just family estates of the Buonapartes," may be tokenized into ['Well', ',', 'Prince', ',', 'so', 'Gen', 'oa', 'and', 'Luc', 'ca', 'are', 'now', 'just', 'family', 'estates', 'of', 'the', 'Buon', 'apar', 'tes', '.'].

In one embodiment, the tokenizer may utilize Huffman coding to split the data into sourceblocks. The Huffman coding-based tokenizer enables efficient and semantically meaningful splitting of the input data into sourceblocks. Huffman coding is a well-known data compression algorithm that assigns variable-length codes to symbols based on their frequency of occurrence. In the context of the LCM, the Huffman coding-based tokenizer adapts this principle to perform semantic splitting of the input data.

With Huffman coding, the tokenizer starts by analyzing the input data and identifying the basic units of meaning, such as words, phrases, or subwords, depending on the specific data modality and the desired level of granularity. These basic units form the initial set of sourceblocks. The tokenizer then performs a frequency analysis of the sourceblocks, counting the occurrences of each sourceblock in the input data. Based on the frequency analysis, the tokenizer constructs a Huffman tree, which is a binary tree that represents the probability distribution of the sourceblocks. The Huffman tree is built by iteratively combining the two least frequent sourceblocks into a single node, assigning binary codes to the branches, and repeating the process until all sourceblocks are included in the tree. The resulting Huffman tree has the property that sourceblocks with higher frequencies are assigned shorter codes, while sourceblocks with lower frequencies are assigned longer codes.

The Huffman coding-based tokenizer then uses the constructed Huffman tree to perform semantic splitting of the input data. It traverses the input data and matches the sequences of symbols against the sourceblocks represented in the Huffman tree. When a sourceblock is identified, the tokenizer assigns the corresponding Huffman code to that sourceblock, effectively compressing the data while preserving its semantic structure. The use of Huffman coding for semantic splitting offers several advantages. It allows for variable-length sourceblocks, enabling the tokenizer to capture meaningful units of varying sizes. This is particularly useful for handling data with different levels of complexity and granularity, such as text with compound words or images with hierarchical structures.

A Huffman coding-based approach optimizes the representation of the sourceblocks based on their frequency of occurrence. By assigning shorter codes to more frequent sourceblocks and longer codes to less frequent ones, the tokenizer achieves data compression while still preserving the semantic information. This compression reduces the overall size of the data and improves the efficiency of subsequent processing stages. Additionally, the Huffman tree construction process inherently captures the statistical properties and patterns within the input data. The resulting sourceblocks and their assigned codes reflect the underlying structure and relationships present in the data. This semantic awareness enhances the ability of the LCM to learn and generate meaningful representations.

After the semantic splitting process, the resulting sourceblocks and their assigned Huffman codes are passed to the codeword allocator. The codeword allocator maps each sourceblock to a unique codeword, which is a compact representation used by the subsequent components of the LCM architecture. The codeword mapping can be based on various schemes, such as a fixed-length binary encoding or a learned embedding space.

Once the input data is tokenized into sourceblocks, the codeword allocator 120 assigns a unique codeword to each sourceblock. The codewords are discrete, compressed representations of the sourceblocks, designed to capture the essential information in a compact form. The codeword allocator can use various mapping schemes to assign codewords to sourceblocks, such as hash functions, lookup tables, or learned mappings. For example, a simple approach could be to use a hash function that maps each sourceblock to a fixed-length binary code. Alternatively, another approach may involve learning a mapping function that assigns codewords based on the semantic similarity of the sourceblocks.

The codebook generation subsystem 130 is responsible for creating and maintaining the codebook, which is a collection of all the unique codewords used by the LCM. The codebook can be generated offline, before the actual processing begins, or it can be updated dynamically as new sourceblocks are encountered during processing. The codebook generation subsystem can use various techniques to create a compact and efficient codebook, such as frequency-based pruning, clustering, or vector quantization. The size of the codebook can be adjusted based on the desired trade-off between compression and information preservation. Going back to the War and Peace example, the string of tokens ['Well', ',', 'Prince', ',', 'so', 'Gen', 'oa', 'and', 'Luc', 'ca', 'are', 'now', 'just', 'family', 'estates', 'of', 'the', 'Buon', 'apar', 'tes', '.'] may be given codewords such as [12, 5, 78, 5, 21, 143, 92, 8, 201, 45, 17, 33, 49, 62, 87, 11, 2, 179, 301, 56, 4], where each token is assigned a unique codeword, which is represented as an integer. The mapping between tokens and codewords is determined by the codebook generated by the LCM system.

The machine learning core 140 is the central component of the LCM architecture, where the actual learning and processing take place. The core operates on the codewords generated by the codeword allocator, learning to process, generate, and manipulate the compressed representations. The machine learning core can be implemented using various configurations, depending on the specific task and data modality.

In one embodiment, the machine learning core 140 may be a Transformer-based core. The Transformer-based core consists of several key components. An embedding layer maps the codewords to dense vector representations, capturing their semantic and syntactic properties. Positional encoding is used to incorporate positional information into the codeword embeddings, enabling the Transformer to distinguish the relative positions of the codewords in the input sequence. The multi-head attention mechanism, which is the core building block of the Transformer, allows the model to attend to different parts of the input sequence simultaneously, capturing complex dependencies and relationships between codewords. Feed-forward networks are used to introduce non-linearity and increase the expressive power of the model. Residual connections and layer normalization are employed to facilitate the flow of information and stabilize the training process.

The Transformer-based core can be implemented using an encoder-decoder architecture. The encoder processes the input codewords and generates contextualized representations, while the decoder takes the encoder's output and generates the target codewords or the desired output sequence. The encoder and decoder are composed of multiple layers of multi-head attention and feed-forward networks, allowing for deep and expressive processing of the codeword representations.

One of the key advantages of the Transformer-based core in the LCM architecture is its ability to capture long-range dependencies between codewords. Unlike recurrent neural networks (RNNs), which process the input sequentially, the Transformer can attend to all codewords in parallel, enabling it to effectively capture relationships and dependencies that span across the entire input sequence. This is useful for processing long and complex data sequences, where capturing long-range dependencies is crucial for understanding the overall context. Another advantage of the Transformer-based core is its parallelization capability. The self-attention mechanism in the Transformer allows for efficient parallel processing of the codewords on hardware accelerators like GPUs. This parallelization enables faster training and inference times, making the LCM architecture suitable for processing large amounts of data in real-time applications.

The Transformer-based core also generates contextualized representations of the codewords, where each codeword's representation is influenced by the surrounding codewords in the input sequence. This contextualization allows the model to capture the semantic and syntactic roles of the codewords based on their context, enabling a deeper understanding of the relationships and meanings within the data. The scalability of the Transformer-based core is another significant advantage in the LCM architecture. By increasing the number of layers, attention heads, and hidden dimensions, the Transformer can learn more complex patterns and representations from large-scale datasets. This scalability has been demonstrated by models like GPT-3, which has billions of parameters and can perform a wide range of tasks with impressive performance.

In another embodiment, the machine learning core 140 may utilize a Variational Autoencoder (VAE)-based core. A VAE-based core consists of two main components: an encoder and a decoder. The encoder takes the codewords as input and maps them to a lower-dimensional latent space representation. The encoder is typically implemented as a neural network, such as a multi-layer perceptron (MLP) or a convolutional neural network (CNN), depending on the nature of the codewords and the data modality. The encoder learns to compress the codewords into a compact latent representation while capturing the essential features and relationships within the data.

The decoder, on the other hand, takes the latent space representation and reconstructs the original codewords. The decoder is also implemented as a neural network, typically the inverse architecture of the encoder. The decoder learns to map the latent space representation back to the codeword space, generating codewords that closely resemble the original input. One of the key advantages of the VAE-based core in the LCM architecture is its ability to learn a continuous and structured latent space representation of the codewords. The latent space captures the underlying patterns and relationships within the data, allowing for smooth interpolation and generation of new codewords. By sampling from the latent space, the VAE-based core can generate novel and meaningful codewords that are similar to the original data distribution.

The VAE-based core also enables efficient compression of the codewords. By encoding the codewords into a lower-dimensional latent space, the VAE reduces the storage and computational requirements of the LCM. The compact latent representation can be used for various downstream tasks, such as data compression, similarity search, or data generation. The VAE-based core in the LCM architecture offers several advantages over traditional data processing techniques. It enables the learning of a compact and expressive latent representation of the codewords, capturing the essential features and relationships within the data. The continuous latent space allows for smooth interpolation and generation of new codewords, enabling tasks such as data augmentation, anomaly detection, and creative content generation.

The LCM architecture with the VAE-based core has a wide range of applications across various domains. In natural language processing, it can be used for tasks such as language modeling, text generation, and text compression. In computer vision, the VAE-based core can be applied to image compression, image generation, and unsupervised representation learning. The architecture can also be used for audio and speech processing, where the codewords represent audio features, enabling tasks such as audio compression, speech synthesis, and music generation.

In another embodiment, the machine learning core 140 may be a Recurrent Neural Network (RNN)-based core. The RNN-based core consists of one or more recurrent layers, such as Long Short-Term Memory (LSTM) or Gated Recurrent Unit (GRU) layers. These recurrent layers maintain an internal state that allows them to remember and process information from previous time steps, enabling the capture of long-term dependencies and context within the codeword sequences.

The RNN-based core takes a sequence of codewords as input and processes them one at a time. At each time step, the RNN-based core updates its internal state based on the current input codeword and the previous state. This allows the core to learn and encode the temporal dependencies and patterns within the codeword sequences.

The RNN-based core can be used for various tasks, such as codeword sequence prediction, codeword generation, and sequence-to-sequence mapping. In codeword sequence prediction, the RNN-based core learns to predict the next codeword in a sequence given the previous codewords. This enables tasks such as language modeling, time series forecasting, and predictive maintenance.

In codeword generation, the RNN-based core can be trained to generate new codeword sequences based on a learned probability distribution. By sampling from this distribution, the core can generate novel and coherent codeword sequences that resemble the training data. This has applications in tasks such as text generation, music composition, and synthetic data generation. Sequence-to-sequence mapping involves using two RNN-based cores, an encoder and a decoder, to map an input codeword sequence to an output codeword sequence. The encoder RNN processes the input sequence and generates a fixed-length context vector that captures the essential information. The decoder RNN takes the context vector and generates the output codeword sequence step by step. This architecture has been successfully applied to tasks such as machine translation, speech recognition, and image captioning.

The RNN-based core in the LCM architecture offers several advantages over traditional data processing techniques. It enables the capture and modeling of temporal dependencies and sequential patterns within the codeword sequences, which is crucial for processing and generating sequential data. The RNN-based core can learn and adapt to the specific characteristics and patterns of the data, allowing for more accurate and contextually relevant processing and generation. Furthermore, the RNN-based core can handle variable-length sequences, making it suitable for processing data with different lengths and temporal resolutions. The recurrent nature of the RNN allows it to maintain and propagate information over long sequences, enabling the capture of long-term dependencies and context.

In another embodiment, the core can be implemented as a hybrid of multiple architectures, combining the strengths of different approaches. For example, a Transformer-VAE hybrid can be used, where the Transformer encoder generates contextualized representations of the codewords, and the VAE decoder generates new codewords based on the learned latent space. The specific choice of the machine learning core can be tailored to the requirements of the task and the characteristics of the data. The modular nature of the LCM architecture allows for easy experimentation and adaptation of different core configurations.

After processing the codewords, the machine learning core generates the output 150 in the desired format. The output can be in the form of codewords, which can be mapped back to the corresponding sourceblocks or tokens using the inverse mapping scheme. Alternatively, the output can be directly generated in the target modality, such as text, images, or audio, depending on the specific application.

The LCM architecture offers several advantages over traditional deep learning approaches. By operating on compressed codewords instead of raw tokens, the LCM can reduce the computational and memory requirements, making it more efficient and scalable. The semantic splitting and codeword representation also allow the LCM to capture the inherent structure and patterns in the data, enabling more effective learning and generalization. Moreover, the modular nature of the LCM architecture allows for easy adaptation to different data modalities and tasks, making it a versatile and flexible framework for various applications.

Figure 2:
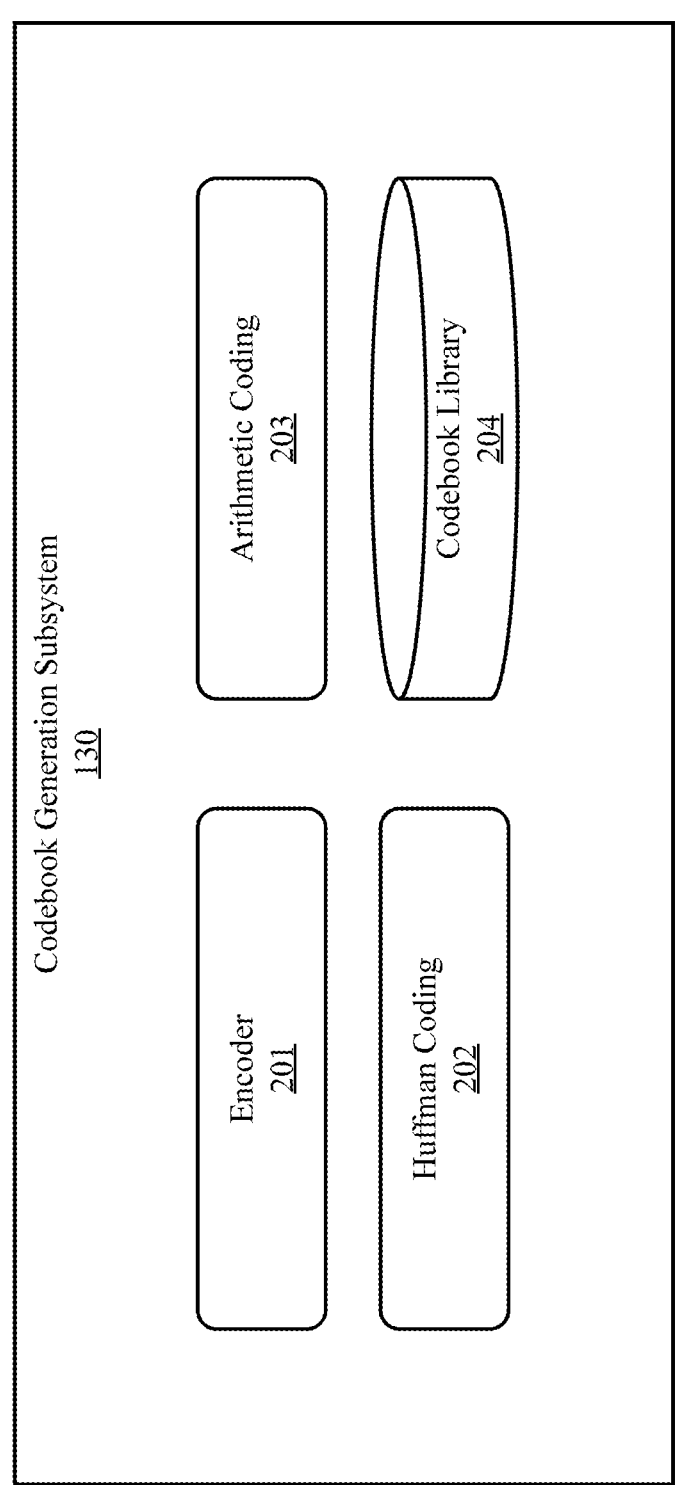
FIG. 2 is a block diagram illustrating an aspect of system for a large codeword model for deep learning, a codeword generation subsystem.

FIG. 2 is a block diagram illustrating an aspect of system and method for a large codeword model for deep learning, a codeword generation subsystem. According to the aspect, codebook generation subsystem 130 is configured to generate one or more codebooks for a collection of input data using various techniques, such as Huffman coding or arithmetic coding.

The codebook is an important component of the codebook-based homomorphic compression system. According to the embodiment, it is a collection of codewords, where each codeword corresponds to a sourceblock in the tokenized input. The codebook may generated based on the frequency distribution of the tokenized inputs, assigning shorter codewords to more frequently occurring tokens and longer codewords to less frequent tokens. There are several techniques for generating the codebook, with the goal of minimizing the average codeword length while maintaining the uniqueness of the codewords. Two common techniques are Huffman coding 202 and arithmetic coding 203. Huffman coding 202 is a variable-length coding technique that assigns codewords based on the frequency of occurrence of each symbol (sourceblock). It constructs a binary tree, known as the Huffman tree, where each leaf node represents a symbol and the path from the root to the leaf determines the codeword. More frequent symbols are assigned shorter codewords, while less frequent symbols receive longer codewords. Huffman coding guarantees an optimal prefix code, meaning no codeword is a prefix of any other codeword. For example, consider the quantized temperature data from the previous example. Let's say the frequency distribution of the intervals is as follows:

Sourceblock 0: 5%
Sourceblock 1: 10%
Sourceblock 2: 20%
Sourceblock 3: 15%
Sourceblock 4: 50%

Using Huffman coding, the codebook generation subsystem 130 can generate the following codebook:

Sourceblock 0: 1100
Sourceblock 1: 101
Sourceblock 2: 00
Sourceblock 3: 01
Sourceblock 4: 11

The most frequent tokenized input (Sourceblock 4) receives the shortest codeword (11), while the least frequent tokenized input (Sourceblock 0) receives the longest codeword (1100).

Arithmetic coding 203 is another entropy coding technique that assigns codewords to sourceblocks based on their probability distribution. Unlike Huffman coding, arithmetic coding does not assign fixed codewords to symbols. Instead, it represents the entire message as a single fractional number between 0 and 1. The interval [0, 1) is recursively divided based on the probabilities of the symbols, and the final codeword is a binary fraction that falls within the subinterval corresponding to the entire message. Arithmetic coding achieves near-optimal compression rates but requires more computational complexity compared to Huffman coding. For example, using the same quantized temperature data and frequency distribution as before, arithmetic coding would assign subintervals to each symbol based on their probabilities:

Sourceblock 0: [0.00, 0.05)
Sourceblock 1: [0.05, 0.15)
Sourceblock 2: [0.15, 0.35)

Sourceblock 3: [0.35, 0.50)

Sourceblock 4: [0.50, 1.00)

To encode a message sequence like [Sourceblock 4, Sourceblock 2, Sourceblock 1], arithmetic coding would recursively subdivide the interval [0, 1) based on the probabilities of the symbols, resulting in a final subinterval. The codeword would be a binary fraction that lies within this final subinterval.

According to an embodiment, an encoder component 201 is present and configured to implement one or more deep learning techniques for generating codewords for quantized data. Deep learning techniques can be employed to generate effective codewords for the quantized data. One approach is to use deep learning-based autoencoder models to learn compact and meaningful representations of the quantized data. Autoencoders are neural network architectures that consist of an encoder and a decoder, where the encoder learns to compress the input data into a lower-dimensional latent space, and the decoder reconstructs the original data from the latent representation.

Here are a few exemplary deep learning encoding techniques that can be implemented for creating codewords of the quantized data, according to an embodiment. Convolutional autoencoders (CAEs) leverage convolutional neural networks (CNNs) in the encoder and decoder parts of the autoencoder. CNNs are particularly effective in capturing spatial dependencies and hierarchical features in data, making them well-suited for encoding structured data such as images or time series. In the context of the codebook-based homomorphic compression, a CAE can be trained on the quantized data. The encoder part of the CAE learns to compress the quantized data into a compact latent representation, which serves as the codeword. The decoder part learns to reconstruct the quantized data from the codeword. As an example, consider an example of using a CAE for encoding quantized sensor data. The quantized data is represented as a 2D matrix, where each row corresponds to a sensor reading, and each column represents a time step. The CAE encoder consists of convolutional layers followed by pooling layers, which gradually reduce the spatial dimensions of the input and extract meaningful features. The output of the encoder is a compact latent representation, which serves as the codeword. The CAE decoder consists of upsampling layers and convolutional layers, which reconstruct the original quantized data from the codeword.

Another form of deep learning coding includes recurrent autoencoders (RAEs). Recurrent autoencoders utilize recurrent neural networks (RNNs) in the encoder and decoder parts of the autoencoder. RNNs are well-suited for processing sequential data, such as time series or natural language, as they can capture temporal dependencies and context. An RAE can be used to encode quantized sequential data. The encoder part of the RAE consists of recurrent layers, such as Long Short-Term Memory (LSTM) or Gated Recurrent Unit (GRU) layers, which process the input sequence and generate a fixed-length latent representation, serving as the codeword. The decoder part of the RAE takes the codeword and reconstructs the original quantized sequence. For example, consider an example of using an RAE for encoding quantized audio data. The quantized audio signal is represented as a sequence of amplitude values. The RAE encoder consists of LSTM layers that process the input sequence and generate a fixed-length latent representation, which serves as the codeword. The RAE decoder, also consisting of LSTM layers, takes the codeword and reconstructs the original quantized audio sequence.

Another form of deep learning coding includes variational autoencoders (VAEs). Variational autoencoders extend the concept of autoencoders by introducing a probabilistic framework. VAEs learn to encode the input data into a probability distribution in the latent space, rather than a single point. The encoder part of the VAE learns to map the input data to the parameters of a probability distribution (e.g., mean and variance of a Gaussian distribution), and the decoder part learns to reconstruct the original data from samples drawn from this distribution. A VAE can be used to generate codewords that capture the underlying probability distribution of the quantized data. The encoder part of the VAE learns to map the quantized data to the parameters of a probability distribution in the latent space. The codewords are then obtained by sampling from this distribution. The decoder part of the VAE learns to reconstruct the original quantized data from the sampled codewords. Consider an example of using a VAE for encoding quantized image data. The quantized images are fed into the VAE encoder, which learns to map each image to the parameters of a Gaussian distribution in the latent space. The codewords are obtained by sampling from this distribution. The VAE decoder takes the sampled codewords and reconstructs the original quantized images.

Another form of deep learning coding includes deep belief networks (DBNs). Deep Belief Networks are generative models that consist of multiple layers of restricted Boltzmann machines (RBMs). DBNs can learn hierarchical representations of the input data by training each layer in an unsupervised manner, followed by fine-tuning the entire network using supervised learning. DBNs can be used to generate codewords that capture the hierarchical structure of the quantized data. The DBN is trained on the quantized data, and the activations of the hidden layers serve as the codewords. The hierarchical nature of DBNs allows for capturing complex patterns and dependencies in the data. Consider an example of using a DBN for encoding quantized text data. The quantized text is represented as a binary vector, where each element corresponds to the presence or absence of a specific word. The DBN is trained on the quantized text data, and the activations of the hidden layers serve as the codewords. The DBN learns to capture the hierarchical structure and semantic relationships in the text data.

These are just a few examples of deep learning encoding techniques that can be explored for creating codewords of the quantized data in a LCM. The choice of the specific deep learning architecture depends on the nature of the data and the desired properties of the codewords. It's important to note that the deep learning encoding process should be designed to generate codewords that are suitable for homomorphic operations. The codewords should exhibit certain properties, such as being compatible with the homomorphic encryption scheme's plaintext space and allowing for efficient homomorphic computations.

During the training process of the deep learning models, the objective function should be designed to capture the desired properties of the codewords, such as minimizing the reconstruction error while ensuring the codewords are suitable for homomorphic operations. Additionally, regularization techniques can be employed to encourage sparsity or other desirable properties in the codewords. Once the deep learning models are trained, the encoder part can be used to generate codewords for new quantized data. The generated codewords can then be used in the codebook-based homomorphic compression scheme, enabling efficient and privacy-preserving computations on the compressed data.

Experimental evaluation and performance analysis can be conducted to assess the effectiveness of the deep learning encoding techniques in generating codewords that achieve good compression ratios, maintain low approximation errors, and enable efficient homomorphic operations. The choice of the deep learning architecture and hyperparameters can be fine-tuned based on the specific requirements and characteristics of the data.

According to the aspect, a codebook library 204 is present and configured to store a plurality of codewords (i.e., a codebook) generated by one or more of the techniques described herein. When it comes to storing the codewords and codebook in the codebook-based homomorphic compression system, several database systems and data storage solutions can be considered. The choice of the storage system depends on factors such as the size of the codebook, the frequency of updates, the retrieval and query requirements, and the overall system architecture. In some implementations key-value stores may be used, Key-value stores are a type of NoSQL database that provide a simple and efficient way to store and retrieve data based on a unique key. Examples of key-value stores include Redis, Memcached, and Amazon DynamoDB. For storing the codewords and codebook, key-value stores can be used to store each codeword as a key-value pair, where the key represents the codeword, and the value represents the corresponding data or metadata associated with the codeword. The codebook can be stored as a collection of key-value pairs, allowing for fast retrieval of codewords based on their keys. Key-value stores offer high performance, low latency, and scalability, making them suitable for scenarios where fast retrieval of codewords is critical.

Document databases, such as MongoDB or Couchbase, store data as flexible, semi-structured documents in formats like JSON or BSON. They provide a schema-less design and allow for easy modification of the data structure. For storing the codewords and codebook, document databases can be used to store each codeword as a document, along with its associated data or metadata. The codebook can be stored as a collection of documents, where each document represents a codeword and its related information. Document databases offer flexibility in terms of data structure, allowing for easy addition or modification of codeword attributes. They also provide querying capabilities based on document fields, enabling efficient retrieval of codewords based on specific criteria.

Relational databases, such as MySQL, PostgreSQL, or Oracle, can also be used to store the codewords and codebook. In a relational database, the codewords can be stored in a table with columns representing the codeword and its associated data or metadata. The codebook can be stored in a separate table, with each row representing a codeword and its corresponding information. Relational databases provide structured querying capabilities using SQL, allowing for efficient retrieval and filtering of codewords based on specific conditions. Relational databases offer strong consistency, ACID properties, and support for complex queries, making them suitable for scenarios where data integrity and structured querying are important.

Graph databases, such as Neo4j or Amazon Neptune, store data as nodes and edges in a graph structure. They are designed to efficiently handle complex relationships and connections between data entities. For storing the codewords and codebook, graph databases can be used to represent the relationships between codewords and their associated data or metadata. Each codeword can be represented as a node in the graph, with edges connecting related codewords or linking codewords to their corresponding data. Graph databases provide efficient traversal and querying capabilities based on the graph structure, allowing for fast retrieval of connected codewords and exploration of relationships between codewords.

Distributed key-value stores, such as Apache Cassandra or Apache HBase, are designed to handle large-scale data and provide high scalability and fault tolerance. They distribute data across multiple nodes in a cluster, allowing for horizontal scaling. For storing the codewords and codebook, distributed key-value stores can be used to store codewords as key-value pairs, similar to regular key-value stores. The codebook can be partitioned and distributed across multiple nodes in the cluster, enabling high scalability and performance. Distributed key-value stores offer eventual consistency, high write throughput, and the ability to handle large volumes of data, making them suitable for scenarios where scalability and fault tolerance are critical.

Figure 3:
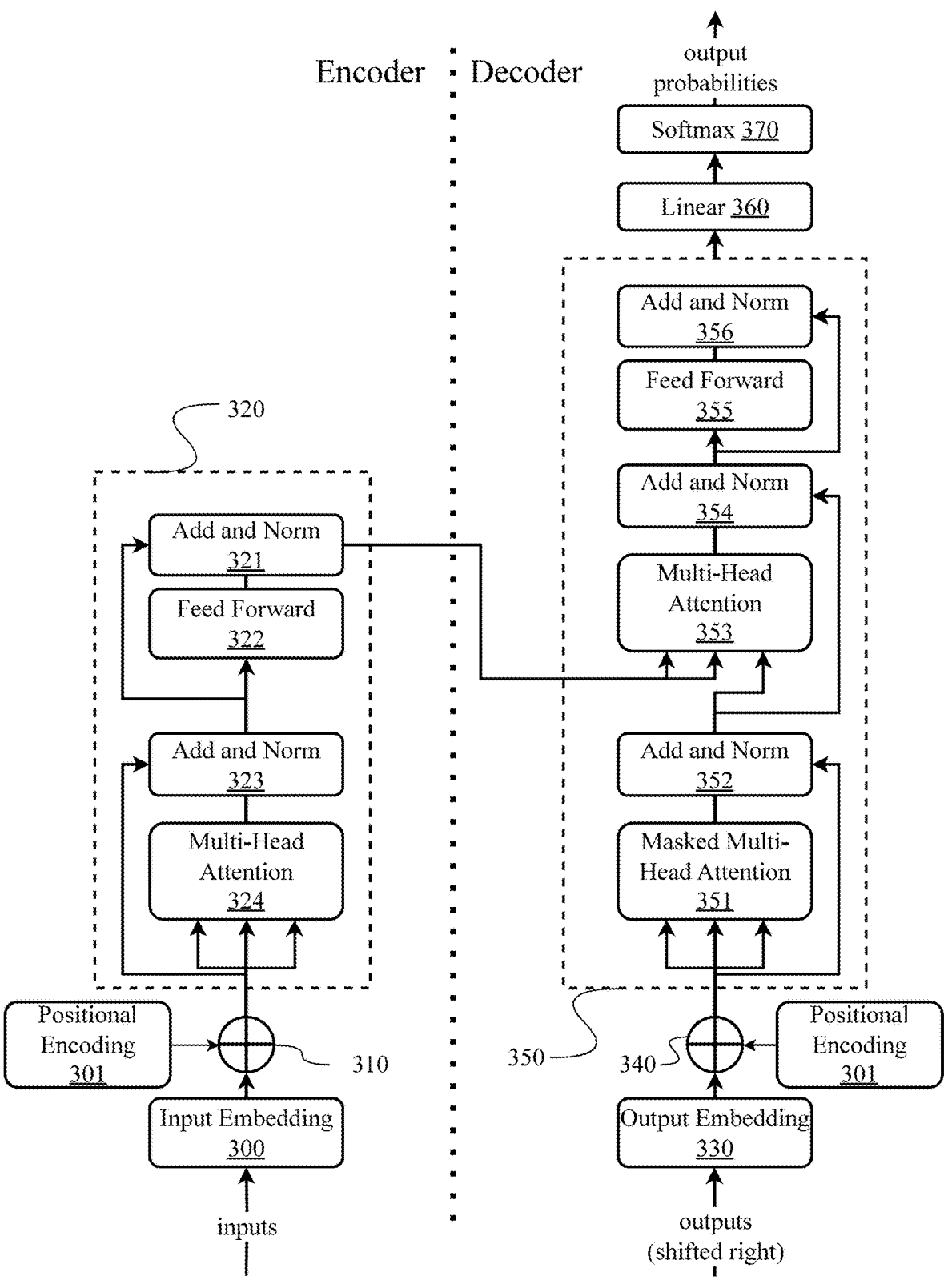
FIG. 3 is a block diagram illustrating an embodiment of the system for a large codeword model for deep learning, where the machine learning core is a Transformer-based core.

FIG. 3 is a block diagram illustrating an embodiment of the system and method for a large codeword model for deep learning, where the machine learning core is a Transformer-based core. A Transformer generally comprises an Encoder (the components on the left side of the illustration) and a Decoder (the components on the right side of the illustration).

The illustrated Transformer comprises an Encoder and a Decoder. The Encoder takes input embeddings and processes them through a stack of layers (represented as dashed box 320). Each layer consists of: positional encoding, which adds position information to the input embeddings; multihead attention, which allows the model to attend to different parts of the input sequence; add and norm, which applies residual connection and layer normalization; feed forward, which is a fully connected feed-forward network; and add and norm which is another residual connection and layer normalization.

The power of the transformer model lies in the self-attention mechanism. This mechanism contributes to accelerated learning compared to traditional models such as long short-term memory models. Self-attention empowers the transformer model with the remarkable capability to meticulously scrutinize distinct segments of a given sequence or even encompass the entire contextual essence of a sentence. This profound contextual awareness enables the model to make predictions with an elevated degree of accuracy and relevance.

The input embedding 300 to the Encoder is a sequence of tokens, typically represented as integers. Each token is mapped to a learnable embedding vector of a fixed size. The embedding layer is a lookup table that converts each token into its corresponding dense vector representation. The embeddings are learned during training and capture semantic and syntactic relationships between tokens.

A dense vector representation, also known as a dense embedding or a continuous vector representation, is a way of representing data, particularly words or tokens, as dense vectors in a high-dimensional continuous space. In the context of natural language processing (NLP) and language models, dense vector representations are used to capture semantic and syntactic information about words or tokens. Each word or token is mapped to a fixed-size vector of real numbers, typically with hundreds or thousands of dimensions. Each word or token is represented by a vector of a fixed size, regardless of the length of the input sequence. The size of the vector is a hyperparameter that is determined during model design. The vectors exist in a continuous high-dimensional space, where each dimension represents a latent feature or aspect of the word or token. The continuous nature allows for capturing fine-grained relationships and similarities between words. The dense vector representations are learned during the training process of the model. The model learns to assign similar vectors to words that have similar meanings or occur in similar contexts. The dense vector representations aim to capture semantic and syntactic relationships between words. Words that have similar meanings or are used in similar contexts tend to have similar vector representations. Dense vector representations allow for performing algebraic operations on words, such as addition and subtraction. These operations can capture analogies and relationships between words, such as "prince"–"man"+"woman"≈"princess". Dense vector representations serve as input features for various downstream NLP tasks, such as text classification, sentiment analysis, named entity recognition, and machine translation. The dense representations provide a rich and informative input to the models, enabling them to learn patterns and make predictions. Some popular examples of dense vector representations include, but are not limited to, Word2Vec, Global Vectors for Word Representations (GloVe), FastText, and BERT.

After the input embedding layer, positional encoding 301 is added to the input embedding to provide position information to the model. The positional encoding 301 and the input embedding 300 may be added using a function 310. Since the Transformer architecture doesn't have inherent recurrence or convolution, positional encodings help capture the order and relative positions of tokens. The positional encodings are typically sine and cosine functions of different frequencies, allowing the model to learn relative positions. The positional encodings have the same dimensionality as the input embeddings and are summed with them.

The Encoder utilizes a multi-head attention mechanism 324 which is a key component of the Transformer architecture. It allows the Encoder to attend to different parts of the input sequence and capture dependencies between tokens. The attention mechanism computes three matrices: Query (Q), Key (K), and Value (V). The Query, Key, and Value matrices are obtained by linearly projecting the input embeddings using learned weight matrices. The attention scores are computed by taking the dot product of the Query matrix with the transpose of the Key matrix, followed by scaling and applying a softmax function. The attention scores determine the importance of each token in the input sequence for a given position. The Value matrix is then multiplied with the attention scores to obtain the weighted sum of the values, which forms the output of the attention mechanism. Multi-Head Attention splits the Query, Key, and Value matrices into multiple heads, allowing the model to attend to different aspects of the input simultaneously. The outputs from each head are concatenated and linearly projected to obtain the final output of the Multi-Head Attention layer 324.

After the Multi-Head Attention layer, a residual connection is applied, followed by Layer Normalization at add and norm 323. The residual connection adds the input embeddings to the output of the attention layer, helping the model learn faster and deeper. Layer Normalization normalizes the activations across the features, stabilizing the training process.

The Feed Forward layer 322 is a fully connected neural network applied to each position of the Encoder's hidden states. It consists of two linear transformations with a Rectified Linear Unit (ReLU) activation function in between. The purpose of the Feed Forward layer is to introduce non-linearity and increase the model's capacity to learn complex representations. The output of the Feed Forward layer has the same dimensionality as the input embeddings. A residual connection and Layer Normalization 321 are applied after the Feed Forward layer.

The Encoder layers 320 are stacked Nx times, where N is a hyperparameter that determines the depth of the Encoder. Each layer follows the same structure: Multi-Head Attention, Add & Norm, Feed Forward, and Add & Norm. By stacking multiple Encoder layers, the model can capture hierarchical and long-range dependencies in the input sequence. The output of the final Encoder layer represents the encoded input sequence, which is then passed to the Decoder for generating the output sequence.

The Decoder generates the output probabilities. It has a similar structure to the Encoder, with a few additions. The Decoder takes output embeddings and processes them through a stack of layers (represented as dashed box 350). The output embedding layer 330 takes the previous output tokens (shifted right by one position) and converts them into dense vectors. Each token is mapped to a learnable embedding vector of a fixed size. The embedding vectors capture semantic and syntactic relationships between tokens.

Positional encoding 301 is added to the output embedding 330 to provide position information to the model. Positional encoding 301 may be added to the output embedding 330 through a function 340. Since the Transformer architecture does not have inherent recurrence or convolution, positional encodings help capture the order and relative positions of tokens. The positional encodings are typically sine and cosine functions of different frequencies, allowing the model to learn relative positions.

The masked multi-head attention 351 mechanism prevents the model form attending to future tokens. This layer performs self-attention on the Decoder's input sequence. It allows the Decoder to attend to different parts of its own input sequence. The attention is "masked" to prevent the Decoder from attending to future tokens, ensuring that the predictions are based only on the previously generated tokens. Multi-head attention splits the input into multiple heads, allowing the model to attend different aspect of the input simultaneously.

After the masked multi-head attention, a residual connection is applied follows by layer normalization via add and norm 352. The residual connection adds the input to the output of the attention layer, helping the model learn faster and deeper. Layer normalization normalizes the activations across the features, stabilizing the training process.

The multi-head attention 353 layer performs attention between the Decoder's hidden states and the Encoder's output. It allows the Decoder to attend to relevant parts of the input sequence based on the Encoder's representations. The attention weights are computed based on the compatibility between the Decoder's hidden states and Encoder's outputs.

Another add and norm 354 layer is then followed by feed forward network 355. This a fully connected feed-forward network applied to each position of the Decoder's hidden states. It consists of two linear transformations with a Rectified Linear Unit (ReLU) activation in between. The feed forward layer helps the model capture non-linear interactions and increases the model's capacity.

Another add and norm 356 layer is followed by linear 360 and softmax 370 layers. The final hidden states of the Decoder are passed through a linear transformation to project them into the vocabulary space. Vocabulary space refers to the set of all unique tokens or words that the model can generate or predict. In the context of language models, the vocabulary is a predefined set of tokens that the model is trained on and can output. When the Decoder's final hidden states are passed through a linear transformation, they are projected into a vector space with the same dimensionality as the size of the vocabulary. Each dimension in this space corresponds to a specific token in the vocabulary. For example, the model has a vocabulary of 10,000 unique tokens. The linear transformation would project the Decoder's hidden states into a 10,000-dimensional vector space. Each element in this vector represents the model's predicted probability or score for the corresponding token in the vocabulary.

A softmax function is applied to the projected values (vectors) to generate output probabilities over the vocabulary. The softmax function normalizes the values so that they sum up to 1, representing a probability distribution over the vocabulary. Each probability indicates the likelihood of a specific token being the next output token. The token with the highest probability is selected as the next output token. During the model's training, the objective is to maximize the probability of the correct next token given the input sequence and the previously generated tokens. The model learns to assign higher probabilities to the tokens that are more likely to appear based on the context. At inference time, the token with the highest probability in the vocabulary space is selected as the next output token. This process is repeated iteratively, with the generated token being fed back into the Decoder as input for the next step, until a stopping criterion is met (e.g., reaching a maximum length or generating an end-of-sequence token). The size and composition of the vocabulary can vary depending on the specific task and the data the model is trained on. It can include words, sub-words, or even characters, depending on the tokenization strategy used.

The Decoder layers 350 can be stacked Nx times, allowing the model to capture complex dependencies and generate coherent output sequences.

This transformer architecture allows the model to process input sequences, capture long-range dependencies, and generate output sequence based on the encoded input and the previously generated codewords.

There are at least three variations of transformer architecture that may enable an LCM. A first such variation comprises Auto-Encoding Models. In autoencoders, the decoder portion of the transformer is discarded after pre-training and only the encoder is used to generate the output. The popular BERT and RoBERTa models are examples of models based on this architecture and perform well on sentiment analysis and text classification. These types of models may be trained using a process called masked language modeling (MLM).

The primary goal of an autoencoder is to learn efficient representations of input data by encoding the data into a lower-dimensional space and then reconstructing the original data from the encoded representation. Autoencoders are trained in an unsupervised manner, meaning they don't require labeled data. They learn to capture the underlying structure and patterns in the input data without explicit guidance. An autoencoder consists of two main components: an encoder and a decoder. The encoder takes the input data and maps it to a lower-dimensional representation, often referred to as the latent space or bottleneck. The decoder takes the latent representation and tries to reconstruct the original input data. Autoencoders can be used for dimensionality reduction by learning a compressed representation of the input data in the latent space. The latent space has a lower dimensionality than the input data, capturing the most salient features or patterns. The training objective of an autoencoder is to minimize the reconstruction error between the original input and the reconstructed output. The model learns to encode and decode the data in a way that preserves the essential information needed for reconstruction. Variants and extensions of autoencoders can include denoising autoencoders, variational autoencoders (VAEs) which introduce a probabilistic approach to autoencoders wherein they learn a probabilistic encoder and decoder, allowing for generating new samples from the learned latent space, and conditional autoencoders which incorporate additional conditions or labels as input to the encoder and decoder, enabling the generation of samples conditioned on specific attributes.

Autoencoders can have various applications. Autoencoders can be used to detect anomalies by measuring the reconstruction error. Anomalous samples tend to have higher reconstruction errors compared to normal samples. Autoencoders can be used as a pre-training step to learn meaningful features from unlabeled data. The learned features can then be used for downstream tasks like classification or clustering. Additionally, or alternatively, autoencoders, particularly VAEs, can be used as generative models to generate new samples similar to the training data by sampling from the learned latent space. It's worth noting that while autoencoders can be effective for certain tasks, they have some limitations. They may struggle to capture complex dependencies and may generate blurry or less sharp reconstructions compared to other generative models like Generative Adversarial Networks (GANs).

Another type of variation is the auto-regressive model which feature the use of only the decoder portion of the transformer architecture. In autoregressive architectures, the decoder portion of the transformer is retained and the encoder portion is not used after model pre-training. Autoregressive models are a class of models that generate outputs by predicting the next element based on the previously generated elements. In the context of the Transformer architecture and language modeling, auto-regressive models are commonly used for tasks such as text generation, machine translation, and language understanding.

Auto-regressive models generate outputs sequentially, one element at a time. In the case of language modeling, the model predicts the next word or token based on the previous words or tokens in the sequence. The prediction of the next element is conditioned on the previously generated elements. The model learns the conditional probability distribution $P(x_t|x\_1, x\_2, \ldots, x\_{t-1})$, where $x\_t$ is the element at position t, and $x\_1, x\_2, \ldots, x\_{t-1}$ are the previously generated elements. The Transformer architecture, particularly the Decoder component, is well-suited for auto-regressive modeling. The Decoder generates the output sequence one element at a time, conditioned on the previously generated elements and the encoded input sequence from the Encoder. In the Transformer Decoder, the self-attention mechanism is masked to prevent the model from attending to future positions during training. This masking ensures that the model relies only on the previously generated elements to make predictions, following the auto-regressive property. During training, the Transformer Decoder uses a technique called teacher forcing. Instead of feeding the model's own predictions as input for the next step, the ground truth target sequence is used. This helps the model learn to generate the correct output sequence based on the input sequence and the previous target tokens. During inference or generation, the Transformer Decoder generates the output sequence one element at a time. At each step, the model takes the previously generated elements as input and predicts the next element. This process continues until a stopping criterion is met, such as reaching a maximum sequence length or generating an end-of-sequence token. Auto-regressive models, including the Transformer, have achieved state-of-the-art performance in language modeling tasks. They excel at capturing the statistical properties and dependencies in sequential data, making them effective for generating coherent and fluent text.

While text generation is the most suitable use case of auto-regressors, they perform exceptionally well on a wide variety of tasks. Most modern LLMs are auto-regressors including, for example, the popular GPT series of LLMs, BERT, and XLNet.

The third variation of the transformer model is the sequence-to-sequence model which utilizes both the encoder and decoder portions of the transformer and can be trained in multiple ways. One of the methods is span corruption and reconstruction. These models are, generally, best suited for language translation. The T5 and BART family of models are examples of sequence-to-sequence models.

Figure 4:
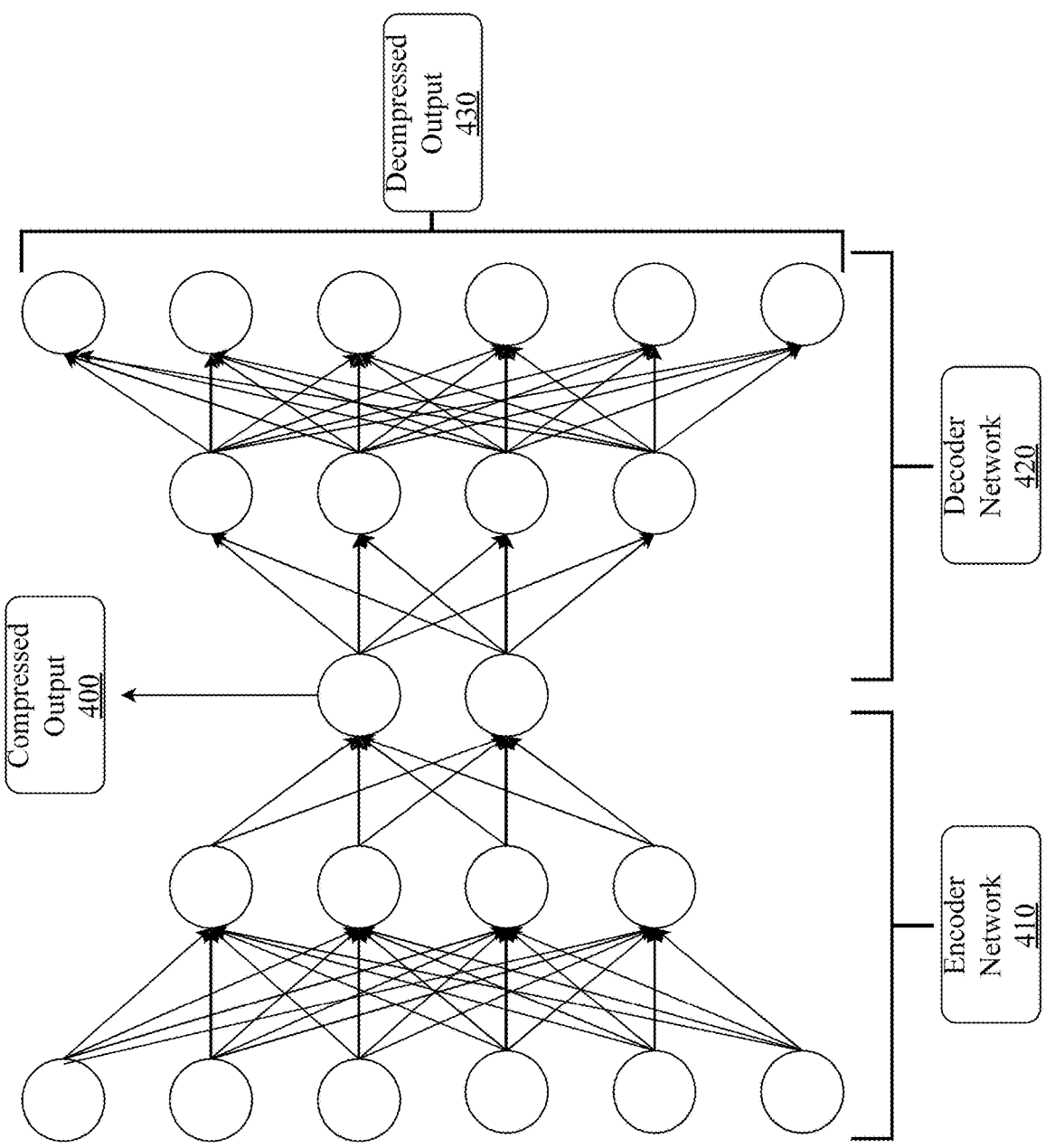
FIG. 4 is a block diagram illustrating an embodiment of the system and method for a large codeword model for deep learning, where the machine learning core is a VAE-based core.

FIG. 4 is a block diagram illustrating an embodiment of the system and method for a large codeword model for deep learning, where the machine learning core is a VAE-based core. An autoencoder network comprises an encoder network 410 or a decoder network 420 that work together to encode and decode data effectively. The encoder network 410 and decoder network 420 within the autoencoder network is comprised of a plurality of layers that contribute to the encoding and decoding process. These layers include, but are not limited to, convolutional layers, pooling layers, and a bottleneck layer. Some embodiments also include functions that operate on information including but not limited to rectified linear unit functions, sigmoid functions, and skip connections.

The convolutional layers are responsible for extracting meaningful features from the input data. They apply convolutional operations using learnable filters to capture spatial patterns and hierarchical representations of the data. The convolutional layers can have different numbers of filters, kernel sizes, and strides to capture features at various scales and resolutions. Skip connections are employed to facilitate the flow of information across different layers of the autoencoder. Skip connections allow the output of a layer to be directly added to the output of a subsequent layer, enabling the network to learn residual mappings and mitigate the vanishing gradient problem. Skip connections help in preserving fine-grained details and improving the training stability of the autoencoder.

Pooling layers are used to downsample the feature maps generated by the convolutional layers. They reduce the spatial dimensions of the feature maps while retaining the most salient information. Common pooling operations include but are not limited to max pooling and average pooling. Pooling layers help in achieving translation invariance, reducing computational complexity, and controlling the receptive field of the autoencoder. Rectified Linear Unit (ReLU) functions introduce non-linearity into the autoencoder by applying a ReLU activation function element-wise to the output of the previous layer. ReLU functions help in capturing complex patterns and relationships in the data by allowing the network to learn non-linear transformations. They also promote sparsity and alleviate the vanishing gradient problem. The bottleneck layer represents the most compressed representation of the input data. The bottleneck layer has a significantly reduced dimensionality compared to the input and output layers of the autoencoder. It forces the network to learn a compact and meaningful encoding of the data, capturing the essential features and discarding redundant information. In one embodiment, the multi-layer autoencoder network is comprised of a plurality of the previously mentioned layers where the sequence and composition of the layers may vary depending on a user's preferences and goals. The bottleneck layer is where the compressed output 400 is created. Each layer previous to the bottleneck layer creates a more and more compressed version of the original input. The layers after the bottleneck layer represent the decoder network 430 where a plurality of layers operate on a compressed input to decompress a data set. Decompression results in a version of the original input which is largely similar but has some lost data from the transformations.

Figure 5:
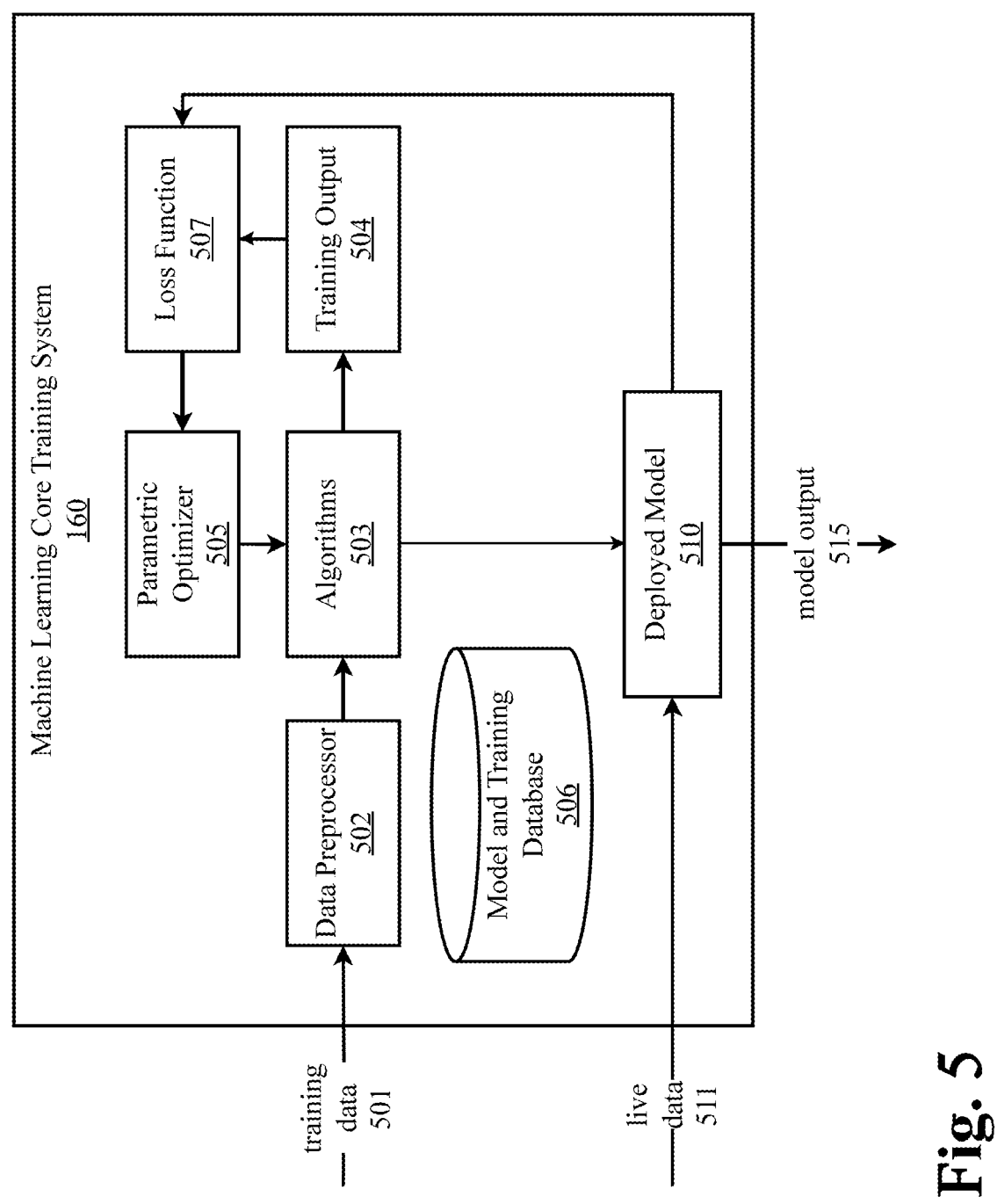
FIG. 5 is a block diagram illustrating an aspect of system and method for a large codeword model for deep learning, a machine learning core training system.

FIG. 5 is a block diagram illustrating an aspect of system and method for a large codeword model for deep learning, a machine learning core training system. According to the embodiment, the machine learning core training system 160 may comprise a model training stage comprising a data preprocessor 502, one or more machine and/or deep learning algorithms 503, training output 504, and a parametric optimizer 505, and a model deployment stage comprising a deployed and fully trained model 510 configured to perform tasks described herein such as processing codewords through a large codeword model. The machine learning core training system 160 may be used to train and deploy a plurality of machine learning architectures in order to support the services provided by the large codeword model for deep learning.

At the model training stage, a plurality of training data 501 may be received by the generative AI training system 550. Data preprocessor 502 may receive the input data (e.g., codewords, sourceblocks) and perform various data preprocessing tasks on the input data to format the data for further processing. For example, data preprocessing can include, but is not limited to, tasks related to data cleansing, data deduplication, data normalization, data transformation, handling missing values, feature extraction and selection, mismatch handling, and/or the like. Data preprocessor 502 may also be configured to create training dataset, a validation dataset, and a test set from the plurality of input data 501. For example, a training dataset may comprise 80% of the preprocessed input data, the validation set 10%, and the test dataset may comprise the remaining 10% of the data. The preprocessed training dataset may be fed as input into one or more machine and/or deep learning algorithms 503 to train a predictive model for object monitoring and detection.

During model training, training output 504 is produced and used to measure the accuracy and usefulness of the predictive outputs. During this process a parametric optimizer 505 may be used to perform algorithmic tuning between model training iterations. Model parameters and hyperparameters can include, but are not limited to, bias, train-test split ratio, learning rate in optimization algorithms (e.g., gradient descent), choice of optimization algorithm (e.g., gradient descent, stochastic gradient descent, of Adam optimizer, etc.), choice of activation function in a neural network layer (e.g., Sigmoid, ReLu, Tanh, etc.), the choice of cost or loss function the model will use, number of hidden layers in a neural network, number of activation unites in each layer, the drop-out rate in a neural network, number of iterations (epochs) in a training the model, number of clusters in a clustering task, kernel or filter size in convolutional layers, pooling size, batch size, the coefficients (or weights) of linear or logistic regression models, cluster centroids, and/or the like. Parameters and hyperparameters may be tuned and then applied to the next round of model training. In this way, the training stage provides a machine learning training loop.

In some implementations, various accuracy metrics may be used by the machine learning core training system 160 to evaluate a model's performance. Metrics can include, but are not limited to, word error rate (WER), word information loss, speaker identification accuracy (e.g., single stream with multiple speakers), inverse text normalization and normalization error rate, punctuation accuracy, timestamp accuracy, latency, resource consumption, custom vocabulary, sentence-level sentiment analysis, multiple languages supported, cost-to-performance tradeoff, and personal identifying information/payment card industry redaction, to name a few. In one embodiment, the system may utilize a loss function 507 to measure the system's performance. The loss function 507 compares the training outputs with an expected output and determined how the algorithm needs to be changed in order to improve the quality of the model output. During the training stage, all outputs may be passed through the loss function 507 on a continuous loop until the algorithms 503 are in a position where they can effectively be incorporated into a deployed model 515.

The test dataset can be used to test the accuracy of the model outputs. If the training model is establishing correlations that satisfy a certain criterion such as but not limited to quality of the correlations and amount of restored lost data, then it can be moved to the model deployment stage as a fully trained and deployed model 510 in a production environment making predictions based on live input data 511 (e.g., interest factor data, incentive data). Further, model correlations and restorations made by deployed model can be used as feedback and applied to model training in the training stage, wherein the model is continuously learning over time using both training data and live data and predictions. A model and training database 506 is present and configured to store training/test datasets and developed models. Database 506 may also store previous versions of models.

According to some embodiments, the one or more machine and/or deep learning models may comprise any suitable algorithm known to those with skill in the art including, but not limited to: LLMs, generative transformers, transformers, supervised learning algorithms such as: regression (e.g., linear, polynomial, logistic, etc.), decision tree, random forest, k-nearest neighbor, support vector machines, Naïve-Bayes algorithm; unsupervised learning algorithms such as clustering algorithms, hidden Markov models, singular value decomposition, and/or the like. Alternatively, or additionally, algorithms 503 may comprise a deep learning algorithm such as neural networks (e.g., recurrent, convolutional, long short-term memory networks, etc.).

In some implementations, the machine learning core training system 160 automatically generates standardized model scorecards for each model produced to provide rapid insights into the model and training data, maintain model provenance, and track performance over time. These model scorecards provide insights into model framework(s) used, training data, training data specifications such as chip size, stride, data splits, baseline hyperparameters, and other factors. Model scorecards may be stored in database(s) 506.

FIG. 6 is a flow diagram illustrating an exemplary method for a large codeword model for deep learning. In a first step 600, collect a plurality of inputs from various sources, such as user input, sensor data, or existing datasets. These inputs can be in different modalities, including text, images, audio, time series, or any other structured or unstructured format.

In a step 610, the collected inputs are tokenized into a plurality of sourceblocks. Tokenization is performed by the tokenizer component of the LCM architecture, which splits the input data into meaningful semantic units called sourceblocks. The tokenizer employs techniques like syntactic splitting or semantic splitting to capture the inherent structure and patterns in the data. For textual data, the tokenizer may use subword tokenization methods like Byte-Pair Encoding (BPE) or WordPiece. For other modalities, such as images or audio, the tokenizer may use domain-specific techniques to identify and extract relevant sourceblocks.

In a step 620, each sourceblock is assigned a unique codeword based on a dictionary generated by the codebook generation subsystem. The codebook generation subsystem creates and maintains a dictionary that maps sourceblocks to their corresponding codewords. Codewords are discrete, compressed representations of the sourceblocks, designed to capture the essential information in a compact form. The codeword assignment can be based on various techniques, such as frequency-based coding, hash functions, or learned mappings.

In a step 630, the assigned codewords are then processed through the machine learning core of the LCM. The machine learning core is the central component of the LCM architecture, responsible for learning and generating responses based on the input codewords. It can be implemented using various configurations, such as a Transformer-based core, a Variational Autoencoder (VAE)-based core, or a combination of different architectures. The machine learning core learns to map input codeword sequences to output codeword sequences, capturing the patterns, relationships, and semantics within the data.

In a step 640, the machine learning core generates an output response. The output response can be in the form of codewords, which are then mapped back to the corresponding sourceblocks or tokens using the inverse mapping scheme defined in the codebook. Alternatively, the output response can be directly generated in the target modality, such as text, images, or audio, depending on the specific application.

In a step 650, to improve the performance and adaptability of the LCM, the machine learning core is trained using the generated output. The training process involves comparing the generated output with the expected or desired output, and adjusting the parameters of the machine learning core accordingly. This can be done using techniques like backpropagation, gradient descent, or reinforcement learning, depending on the specific architecture and objective of the LCM. The training process allows the LCM to learn from its own outputs and continuously improve its performance over time.

Detailed Description of Exemplary Aspects

Figure 7:
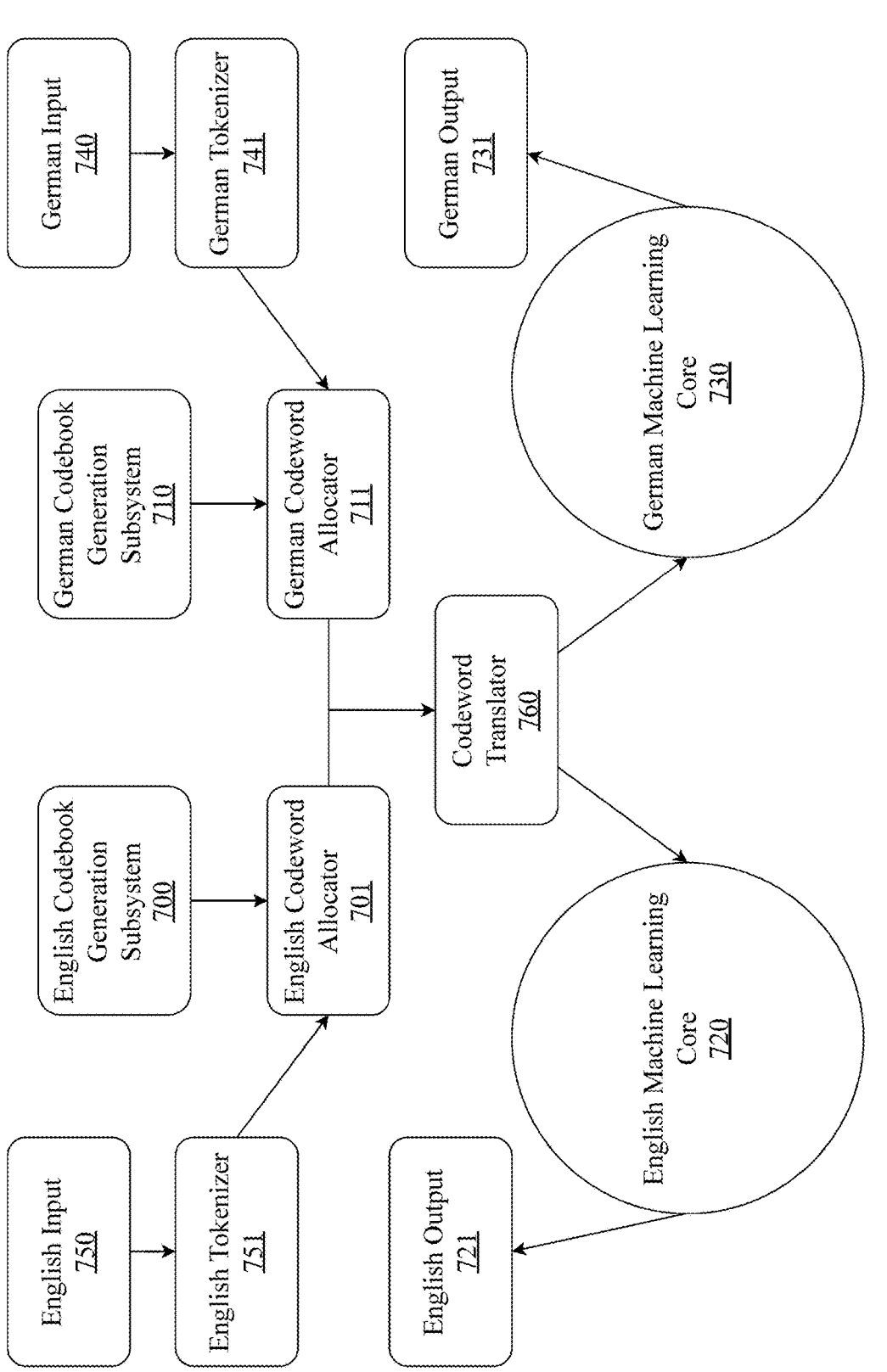
FIG. 7 is a block diagram illustrating an exemplary embodiment of a large codeword model where the model is configured to translate various language inputs.

FIG. 7 is a block diagram illustrating an exemplary embodiment of a large codeword model where the model is configured to translate various language inputs. The system consists of several key components that work together to enable translation between two languages, in this case, English and German. The system includes separate codebook generation subsystems, codeword allocators, and machine learning cores for each language, as well as a codeword translator that facilitates the translation process.

An English input 750 represents the source text or data that needs to be translated from English to German. This input is fed into an English tokenizer 751, which is responsible for tokenizing the English input into a plurality of sourceblocks. The English tokenizer 751 employs language-specific techniques, such as subword tokenization methods like Byte-Pair Encoding (BPE) or WordPiece, to split the input into meaningful semantic units that capture the linguistic structure and patterns of the English language.

The tokenized English sourceblocks are then processed by an English codebook generation subsystem 700. This subsystem generates and maintains a codebook specifically for the English language. The English codebook is a dictionary that maps each English sourceblock to a corresponding codeword. Codewords are discrete, compressed representations of the sourceblocks, designed to capture the essential linguistic information in a compact form. The codebook generation subsystem uses techniques like frequency-based coding, hash functions, or learned mappings to assign codewords to the sourceblocks. An English codeword allocator 701 takes the tokenized English sourceblocks and assigns the corresponding codewords from the English codebook. This process converts the English sourceblocks into a sequence of codewords that represent the English input in a compressed and efficient format.

The sequence of English codewords is then processed by an English machine learning core 720. This core is a specialized component of the LCM architecture that is trained specifically on the English language. It learns to map input codeword sequences to output codeword sequences, capturing the linguistic patterns, relationships, and semantics of the English language. The English machine learning core 720 may be implemented using various configurations, such as a Transformer-based core, a Variational Autoencoder (VAE)-based core, or a combination of different architectures, tailored to the characteristics of the English language.

The English machine learning core 720 generates an English output 721 in the form of a sequence of codewords. These codewords represent the translated content in the English language, encoded in the compressed codeword format.

To perform the translation from English to German, the system utilizes a codeword translator 760. The codeword translator 760 maps the English codewords to their corresponding German codewords. It learns the mappings between the codewords of the two languages, enabling cross-lingual translation. The codeword translator 760 can be implemented using various techniques, such as neural machine translation models, cross-lingual word embeddings, or learned mapping functions.

In the depicted case, the codeword translator 760 takes the English codeword output 721 and translates it into a sequence of German codewords. These German codewords represent the translated content in the German language, encoded in the compressed codeword format.

The translated German codewords are then processed by a German machine learning core 730. Similar to the English machine learning core 720, the German Machine Learning Core is a specialized component trained specifically on the German language. It learns to map input German codeword sequences to output sequences in the German language, capturing the linguistic patterns and semantics of German. The German machine learning core 730 generates a German output 731 based on the translated German codewords. This output represents the final translated content in the German language.

The system also includes a German codebook generation subsystem 710 and a German codeword allocator 711, which serve similar purposes as their English counterparts but are specific to the German language. These components handle the generation and allocation of German codewords based on a German input 740 and a German tokenizer 741. This system may be configured to handle any plurality of languages. The English and German codebooks and machine learning cores are simply examples. Likewise, a machine learning core may be trained to process any given language, depending on needs. The modular architecture of the system allows for flexibility and scalability in handling multiple languages. The system can be extended to support additional language pairs by incorporating language-specific codebook generation subsystems, codeword allocators, and machine learning cores, along with corresponding codeword translators.

Figure 8:
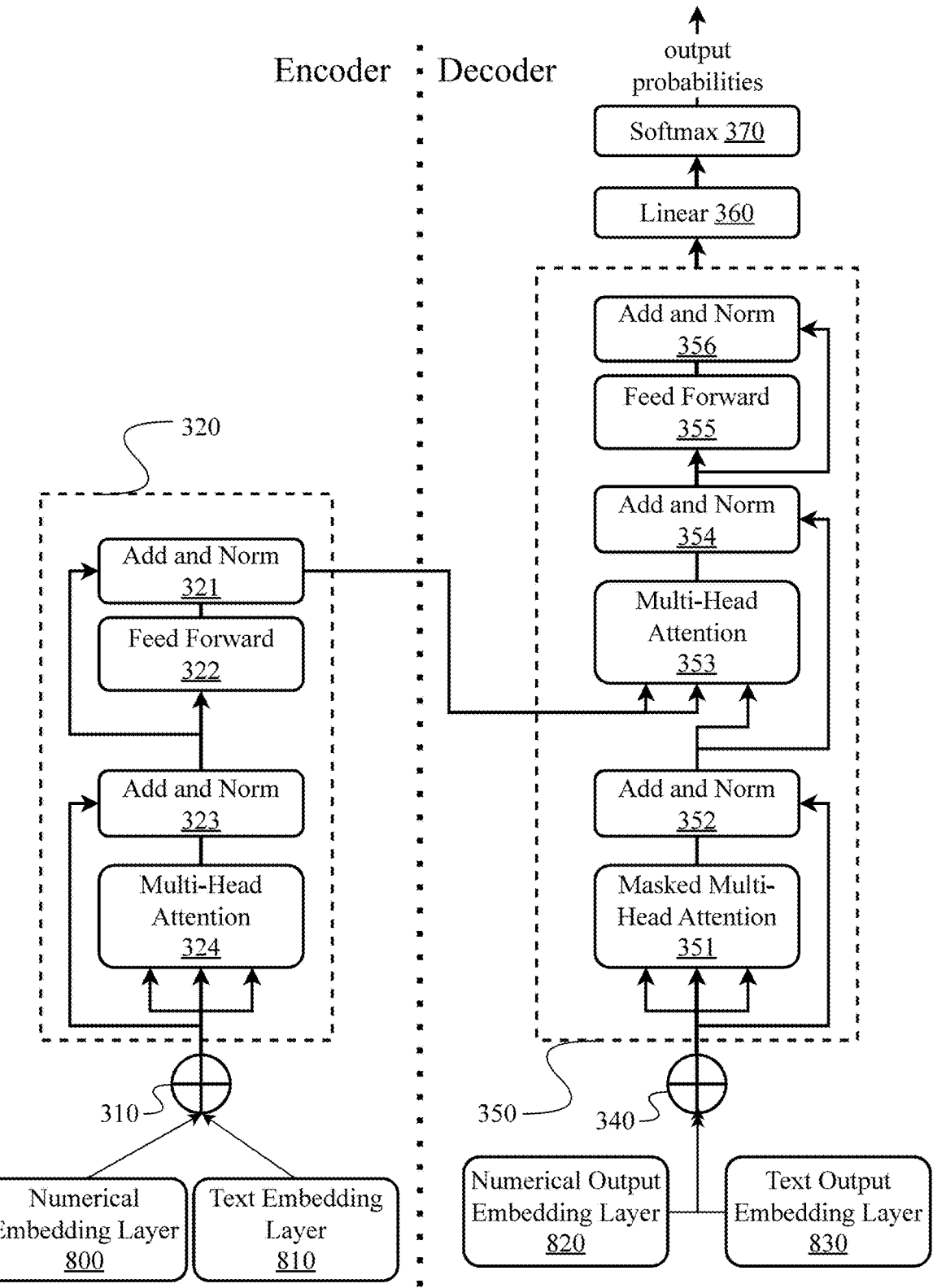
FIG. 8 is a block diagram illustrating an exemplary embodiment of a large codeword model with a dual embedding layer.

FIG. 8 is a block diagram illustrating an exemplary embodiment of a large codeword model with a dual embedding layer. The LCM may be configured to process inputs through a plurality of embedding layers. In one example, inputs of different modalities may be processed through a numerical embedding layer 800 and a text embedding layer 810. The numerical embedding layer 800 is responsible for processing numerical input data, mapping it into a dense vector representation. It learns to capture the relevant patterns and relationships within the numerical data. Similarly, the text embedding layer 810 handles the processing of textual input data, mapping each token to a dense vector representation and capturing the semantic and syntactic information present in the text.

The embedded vectors from each embedding layer may be concatenated to form a single input stream. To concatenate the numerical and text embeddings along the feature dimension, they have the same sequence length. This can be achieved by padding the shorter sequence or truncating the longer sequence to match the lengths. The numerical embeddings and text embeddings are then concatenated along the feature dimension. The feature dimensionality of the combined sequence is the sum of the embedding dimensions of the individual modalities. The combined input sequence contains information from both the numerical and text input data, with each position in the sequence representing a concatenation of the corresponding numerical and text embeddings.

The combined input sequence may then be passed through an encoder within a transformer. Inside the encoder, a multi-head attention 324 sub-layer performs self-attention on the combined input sequence. It allows the model to attend to different positions within the sequence and capture dependencies between the numerical and text features. The self-attention mechanism computes attention weights based on the similarity between different positions in the sequence, enabling the model to focus on relevant information. Feed forward layers within the transformer may learn to combine and transform features from all types of codewords, non-dependent on their original modality.

The single input stream is processed through the remainder of the transformer architecture, which is explained more in depth in FIG. 4. By concatenating the embeddings from different modalities and processing them through the Transformer architecture, the system can effectively learn and utilize the cross-modal interactions and dependencies. The self-attention mechanism in the Transformer allows the model to capture relationships between the numerical and text features at different positions in the sequence, enabling it to generate coherent and contextually relevant outputs.

The concatenation of embeddings along the feature dimension provides a flexible and extensible approach to integrating multiple input modalities. It allows the system to handle various data types and learn joint representations that leverage information from different sources. This approach can be extended to incorporate additional modalities by adding corresponding embedding layers and concatenating their outputs to the combined input sequence.

Figure 9:
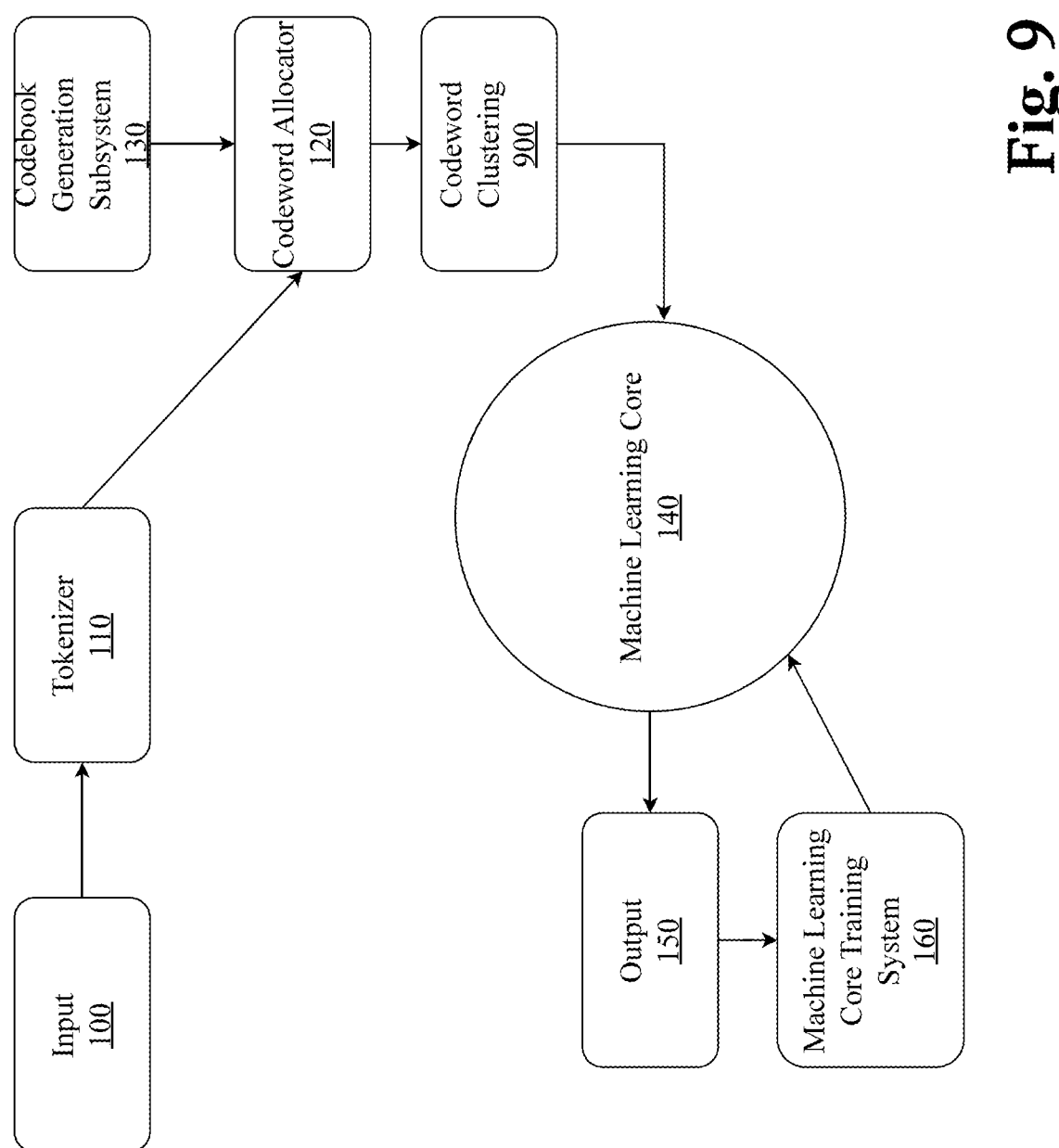
FIG. 9 is a block diagram illustrating an exemplary embodiment of a large codeword model which uses codeword clustering.

FIG. 9 is a block diagram illustrating an exemplary embodiment of a large codeword model which uses codeword clustering. This approach aims to capture semantic similarities and relationships among codewords, enabling more efficient and meaningful representations for downstream processing.

The system starts with an input 100, which receives the raw data that needs to be processed. This data can be in various formats, such as text, images, audio, or any other structured or unstructured data. The input data is then passed to a tokenizer 110, which is responsible for tokenizing the raw data into a sequence of smaller units called sourceblocks. The tokenization process depends on the specific data type and can involve techniques like subword tokenization, byte-pair encoding, or domain-specific tokenization methods.

After tokenization, the sourceblocks are sent to a codeword allocator 120. The codeword allocator 120 assigns a unique codeword to each sourceblock based on a predefined codebook generated by a codebook generation subsystem 130. The codebook is a mapping between sourceblocks and their corresponding codewords, which are compact and discrete representations of the sourceblocks. The codebook generation subsystem 130 uses techniques like frequency-based coding, hash functions, or learned mappings to generate the codebook.

The assigned codewords are then passed to the codeword clustering 900 component, which groups semantically similar or related codewords together based on their co-occurrence patterns or semantic proximity in the training data. This clustering process aims to capture the underlying semantic structure and relationships among the codewords. Various clustering algorithms can be employed in the codeword clustering 900 component, such as k-means clustering, hierarchical clustering, or density-based clustering. The choice of the clustering algorithm depends on the specific characteristics of the data and the desired granularity of the clusters. The clustering process takes into account the semantic similarity between codewords, which can be measured using techniques like cosine similarity, Euclidean distance, or other similarity metrics.

Once the codewords are clustered, the system learns individual vector embeddings for each cluster of codewords, rather than learning embeddings for individual codewords. This approach reduces the dimensionality of the embedding space and allows for more efficient representation learning. The clustered codewords are mapped to dense vector representations in a continuous vector space, capturing the semantic and syntactic information of the codewords within each cluster.

The vector embeddings of the clustered codewords may then processed by the machine learning core 140. The machine learning core 140 is responsible for learning and generating meaningful representations and outputs based on the input codeword embeddings. It can consist of various architectures, such as Transformer models, recurrent neural networks, or convolutional neural networks, depending on the specific task and data type. An output 150 is generated by the machine learning core 140 and is based on the processed codeword embeddings from the machine learning core 140. The output can be in various formats, such as text, images, or any other desired representation, depending on the specific application.

The incorporation of codeword clustering before vector embedding in the LCM architecture brings several benefits. By grouping semantically similar codewords together, the system can learn more meaningful and compact representations, reducing the dimensionality of the embedding space. This can lead to improved efficiency in terms of memory and computational resources. Moreover, the clustered codeword embeddings can capture higher-level semantic concepts and relationships, enabling the system to generalize better to unseen or rare codewords. The clustering process helps in handling data sparsity and can improve the robustness and interpretability of the learned representations.

FIG. 10 is a flow diagram illustrating an exemplary method for language translation using a large codeword model for deep learning. In a first step 1000, collect a plurality of inputs in a first language. These inputs can be in various forms, such as text, speech, or any other language-based data. The first language represents the source language from which the translation will be performed.

In a step 1010, the collected inputs in the first language are tokenized into a plurality of sourceblocks. Tokenization is performed by the tokenizer component of the LCM architecture, which splits the input data into meaningful semantic units called sourceblocks. The tokenizer employs language-specific techniques to capture the linguistic structure and patterns of the first language. This may involve using subword tokenization methods like Byte-Pair Encoding (BPE) or WordPiece, or language-specific tokenization rules based on the grammatical and morphological properties of the first language.

In a step 1020, each sourceblock in the first language is assigned a codeword based on a first language codebook. The LCM architecture maintains a plurality of codebooks, each configured for a specific language. The first language codebook is a dictionary that maps sourceblocks in the first language to their corresponding codewords. Codewords are discrete, compressed representations of the sourceblocks, designed to capture the essential linguistic information in a compact form. The codeword assignment can be based on various techniques, such as frequency-based coding, hash functions, or learned mappings specific to the first language.

In a step 1030, the assigned first language codewords are then processed through a first language machine learning core. The first language machine learning core is a specialized component of the LCM architecture that is trained specifically on the first language. It learns to map input codeword sequences in the first language to output codeword sequences, capturing the linguistic patterns, relationships, and semantics of the first language. The first language machine learning core can be implemented using various configurations, such as a Transformer-based core, a Variational Autoencoder (VAE)-based core, or a combination of different architectures, tailored to the characteristics of the first language.

The first language machine learning core generates a first language codeword response. This response represents the output of the LCM in the first language, encoded as a sequence of codewords.

In a step 1040, a codeword translated is used to translate the first language codeword response into the desired language. The codeword translator is a component of the LCM architecture that maps codewords from the first language codebook to codewords in the desired language codebook. It learns the mappings between codewords across different languages, enabling cross-lingual translation. The codeword translator can be implemented using various techniques, such as neural machine translation models, cross-lingual word embeddings, or learned mapping functions.

The codeword translator converts the first language codeword response into a desired language codeword response. This response represents the translated output in the desired language, encoded as a sequence of codewords from the desired language codebook.

In a step 1050, the desired language codeword response is processed through a desired language machine learning core. The desired language machine learning core is another specialized component of the LCM architecture, trained specifically on the desired language. It learns to map input codeword sequences in the desired language to output sequences in the same language, capturing the linguistic patterns and semantics of the desired language. The desired language machine learning core generates a full desired language response which represents the final translated output in the desired language.

The method described provides a framework for using LCMs as translators between different languages. By maintaining language-specific codebooks and machine learning cores, the LCM can effectively capture the linguistic properties and nuances of each language. The codeword translator acts as a bridge between the different language representations, enabling cross-lingual translation. The modular nature of the LCM architecture allows for flexibility and scalability in handling multiple languages. New languages can be added by creating language-specific codebooks and training corresponding machine learning cores. The codeword translator can be extended to support translation between multiple language pairs, enabling a versatile and efficient translation system.

FIG. 11 is a flow diagram illustrating an exemplary method for codeword clustering using a large codeword model. In a step 1100, collect a plurality of inputs. These inputs can be from various sources and modalities, such as text, images, audio, time series, or any other structured or unstructured data. The inputs represent the data that needs to be processed by the LCM.

In a step 1110, the collected inputs are tokenized into a plurality of sourceblocks. Tokenization is performed by the tokenizer component of the LCM architecture, which splits the input data into meaningful semantic units called sourceblocks. The tokenizer employs techniques specific to each input modality to capture the relevant patterns and structures. For textual data, this may involve using subword tokenization methods like Byte-Pair Encoding (BPE) or WordPiece. For other modalities, such as images or audio, the tokenizer may use domain-specific techniques to extract relevant features or segments.

In a step 1120, each sourceblock is assigned a codeword based on a codebook. The codebook is a dictionary that maps sourceblocks to their corresponding codewords. Codewords are discrete, compressed representations of the sourceblocks, designed to capture the essential information in a compact form. The codeword assignment can be based on various techniques, such as frequency-based coding, hash functions, or learned mappings.

In a step 1130, the assigned codewords are then clustered based on their semantic similarity or co-occurrence patterns in the training data. Codeword clustering is a technique that groups semantically related or frequently co-occurring codewords together. This clustering process aims to capture the underlying semantic structure and relationships among the codewords. Various clustering algorithms can be employed, such as but not limited to k-means clustering, hierarchical clustering, or topic modeling techniques like Latent Dirichlet Allocation (LDA). The clustering algorithm takes into account the semantic similarity between codewords, which can be determined using measures like cosine similarity or semantic embeddings learned from the training data.

In a step 1140, a single embedding vector is learned for each codeword cluster. The embedding vector represents the shared semantic representation of the codewords within a cluster. By learning embeddings at the cluster level, the LCM can capture the high-level semantic concepts and relationships among the codewords. The embedding vectors are typically learned using techniques like word2vec, GloVe, or other embedding learning algorithms. These algorithms leverage the co-occurrence patterns and semantic similarities of the codewords within the clusters to learn dense, continuous vector representations.

In a step 1150, the learned embedding vectors for the codeword clusters are then processed through the machine learning core of the LCM. The machine learning core can be implemented using various architectures, such as a Transformer-based core, a Variational Autoencoder (VAE)-based core, or a combination of different models. The machine learning core takes the embedding vectors as input and learns to map them to the desired output. It captures the patterns, relationships, and semantics encoded in the embedding vectors to generate meaningful and coherent outputs. The machine learning core generates an output based on the processed embedding vectors. The output can be in the form of codewords, which are then mapped back to the corresponding sourceblocks or tokens using the codebook. Alternatively, the output can be directly generated in the target modality, such as text, images, or any other desired format, depending on the specific application.

The method described provides a framework for using an LCM with codeword clustering and learned embedding vectors. By clustering semantically similar or co-occurring codewords together and learning a single embedding vector for each cluster, the LCM can capture high-level semantic concepts and relationships among the codewords. This approach reduces the dimensionality of the embedding space and allows for more efficient processing and storage of the learned representations. Codeword clustering and embedding learning offer several advantages. It enables the LCM to capture semantic similarities and relationships among codewords, leading to more meaningful and coherent outputs. By learning embeddings at the cluster level, the LCM can generalize better to unseen or rare codewords, as they can be associated with the nearest cluster embedding. Additionally, the reduced dimensionality of the embedding space can lead to faster training and inference times, as well as lower memory requirements.

The specific implementation details, such as the choice of clustering algorithm, embedding learning technique, and machine learning core architecture, can be adapted based on the characteristics of the data and the desired output. The modular nature of the LCM architecture allows for flexibility in incorporating different clustering and embedding learning approaches. By leveraging codeword clustering and learned embedding vectors, the LCM can capture semantic relationships and generate more meaningful and coherent outputs. This approach has potential applications in various domains, such as natural language processing, information retrieval, and content generation, among others. It can lead to improved performance, generalization, and efficiency in processing and generating data using LCMs.

FIG. 12 is a flow diagram illustrating an exemplary method for a large codeword model for deep learning using a dual embedding layer. In a first step 1200, collect a plurality of inputs. These inputs can be from various sources and modalities, such as text, images, audio, time series, or any other structured or unstructured data. The inputs represent the data that needs to be processed by the LCM.

In a step 1210, the collected inputs are tokenized into a plurality of sourceblocks. Tokenization is performed by the tokenizer component of the LCM architecture, which splits the input data into meaningful semantic units called source-blocks. The tokenizer employs techniques specific to each input modality to capture the relevant patterns and structures. For textual data, this may involve using subword tokenization methods like Byte-Pair Encoding (BPE) or WordPiece. For other modalities, such as images or audio, the tokenizer may use domain-specific techniques to extract relevant features or segments.

In a step 1220, each sourceblock is assigned a codeword based on a codebook. The codebook is a dictionary that maps sourceblocks to their corresponding codewords. Codewords are discrete, compressed representations of the sourceblocks, designed to capture the essential information in a compact form. The codeword assignment can be based on various techniques, such as frequency-based coding, hash functions, or learned mappings.

In a step 1230, the assigned codewords are then passed through a plurality of embedding layers. Unlike traditional transformer architectures that use a single embedding layer, this modified LCM architecture employs multiple embedding layers, each configured to receive a different kind of input. Each embedding layer learns a dense vector representation specific to its corresponding input modality. For example, there can be separate embedding layers for text, images, audio, and other input types. The embedding layers capture the semantic and structural information of the input codewords in a continuous vector space.

In a step 1240, the embeddings from the different input modalities are then concatenated to form a single combined input sequence. This concatenation process brings together the learned representations from each embedding layer, creating a unified representation that captures the information from all input modalities. The combined input sequence represents a multi-modal representation of the input data.

In a step 1250, the combined input sequence is then processed through the remaining portion of the machine learning core. This remaining portion can include various components, such as self-attention mechanisms, feedforward layers, and output layers, depending on the specific architecture of the LCM. The machine learning core learns to map the combined input sequence to the desired output, capturing the relationships and interactions between the different input modalities.

In a step 1250, the machine learning core generates an output based on the processed combined input sequence. The output can be in the form of codewords, which are then mapped back to the corresponding sourceblocks or tokens using the codebook. Alternatively, the output can be directly generated in the target modality, such as text, images, or any other desired format, depending on the specific application.

The method provides a framework for using a modified LCM architecture with multiple embedding layers to handle diverse input modalities. By employing separate embedding layers for each input type, the LCM can learn specialized representations that capture the unique characteristics and patterns of each modality. The concatenation of these embeddings allows for a unified processing of the multimodal input, enabling the LCM to learn and generate outputs that leverage the combined information from all input sources.

The specific implementation details of the embedding layers and the remaining portion of the machine learning core can be adapted based on the requirements of the application and the characteristics of the input data. The modular nature of this modified LCM architecture allows for customization and extension to incorporate additional input modalities or processing components as needed.

By leveraging the power of multiple embedding layers and the combined processing of multi-modal inputs, this modified LCM architecture opens up new possibilities for building deep learning models that can handle diverse data types and generate rich, multi-modal outputs. It has potential applications in various domains, such as multimedia content generation, cross-modal retrieval, and multi-modal reasoning, among others.

Modality Agnostic LCM For Deep Learning System Architecture

Figure 13:
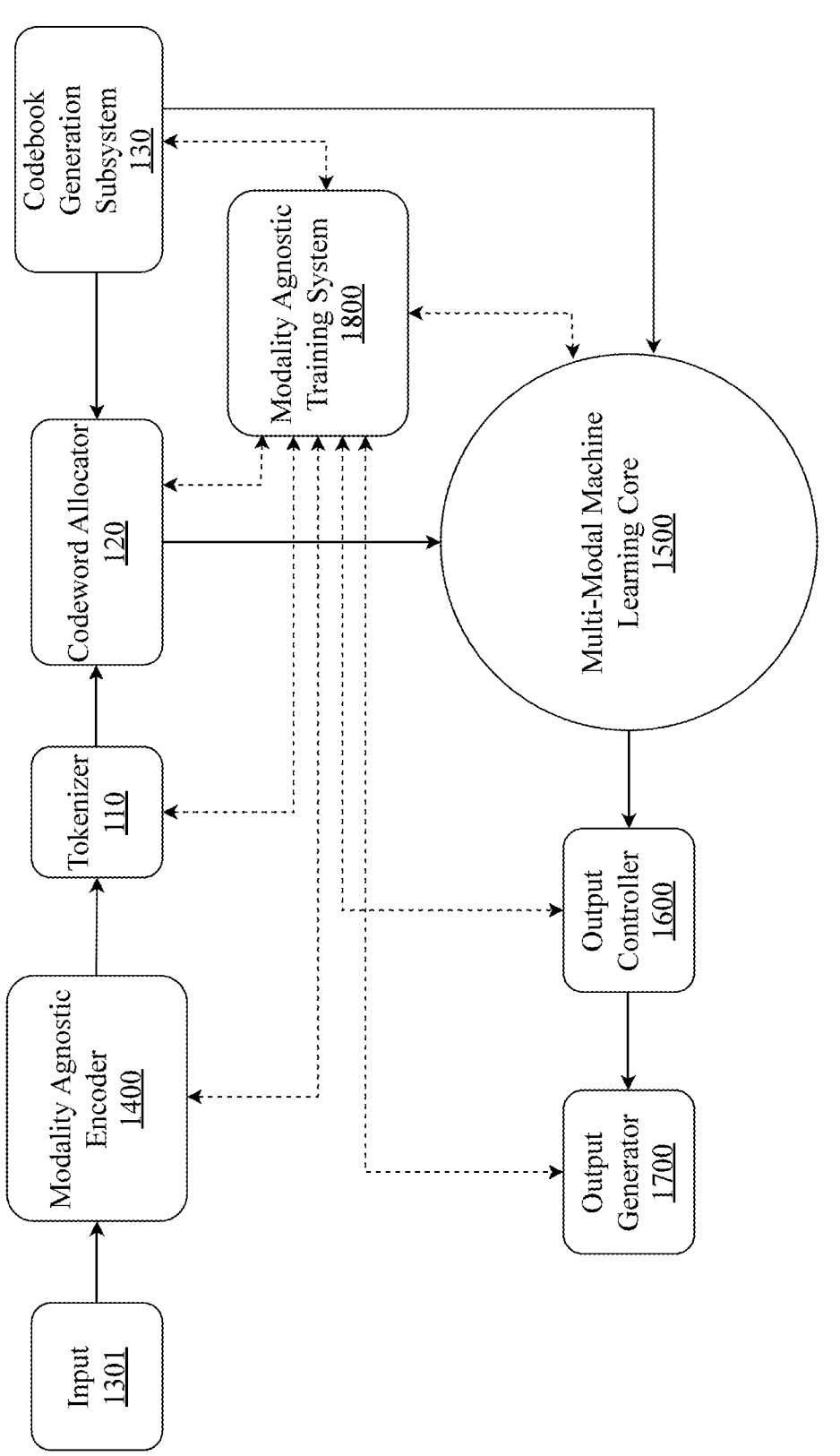
FIG. 13 is a block diagram illustrating an exemplary system architecture for a modality agnostic large codeword model for deep learning.

FIG. 13 is a block diagram illustrating an exemplary system architecture for a modality agnostic large codeword model for deep learning 1300. An input 1301 represents the raw data that needs to be processed by the LCM. This data can be in various modalities, such as text, images, audio, time series, or any other structured or unstructured format. The input data 1301 is fed into the modality agnostic encoder 1400 for initial processing.

The modality agnostic encoder 1400 is responsible for processing inputs from different modalities and converting them into a unified representation. This unified representation is then passed to the tokenizer 110 for further processing.

A tokenizer 110 is responsible for splitting the unified representation into meaningful semantic units called source-blocks. This process, known as semantic splitting, aims to capture the inherent structure and patterns in the data. The tokenizer can employ various techniques to identify the optimal sourceblocks, such as rule-based splitting, statistical methods, or machine learning approaches.

Once the unified representation is tokenized into source-blocks, the codeword allocator 120 assigns a unique codeword to each sourceblock. The codewords are discrete, compressed representations of the sourceblocks, designed to capture the essential information in a compact form.

The codebook generation subsystem 130 is responsible for creating and maintaining the codebook, which is a collection of all the unique codewords used by the LCM. The codebook can be generated offline, before the actual processing begins, or it can be updated dynamically as new sourceblocks are encountered during processing.

The multi-modal machine learning core 1500 is the central component of the LCM architecture, where the actual learning and processing take place. The core operates on the codewords generated by the codeword allocator, learning to process, generate, and manipulate the compressed representations across multiple modalities. The multi-modal machine learning core can be implemented using various configurations, depending on the specific tasks and data modalities.

After processing the codewords, the multi-modal machine learning core 1500 generates a codeword response. This response is then passed to the output controller 1600, which determines which output modalities to activate based on the input and task requirements.

The output generator 1700 takes the processed information from the output controller and generates the final output in the appropriate modalities. This includes, for example, text, images, audio, or any combination thereof, depending on the specific application and requirements.

The modality agnostic training system 1800 is responsible for training the multi-modal machine learning core and other components of the LCM. It enables simultaneous training on multiple modalities, transfer learning between modalities, and joint representation learning.

The LCM architecture offers several advantages over traditional deep learning approaches. By operating on compressed codewords instead of raw tokens and utilizing a modality agnostic approach, the LCM can reduce the computational and memory requirements, making it more efficient and scalable across various data types. The semantic splitting and codeword representation also allow the LCM to capture the inherent structure and patterns in the data, enabling more effective learning and generalization across modalities. Moreover, the modular nature of the LCM architecture allows for easy adaptation to different data modalities and tasks, making it a versatile and flexible framework for various applications.

In a non-limiting use case example, the modality agnostic large codeword model for deep learning 1300 is used in a multimodal content analysis and generation system for social media platforms. Input 1301 consists of user-generated content including text posts, images, and short video clips. The modality agnostic encoder 1400 processes these diverse inputs, converting them into a unified representation that captures the essence of the content across modalities.

The tokenizer 110 then splits this unified representation into sourceblocks, which the codeword allocator 120 would assign unique codewords. These codewords, maintained by the codebook generation subsystem 130, would represent complex multimodal concepts in a compact form.

The multi-modal machine learning core 1500 analyzes these codewords, understanding the relationships between text, images, and video content. It could identify trends, sentiment, and user engagement patterns across different types of content.

Based on this analysis, the system then generates new content. The output controller 1600 determines that for a given topic, a combination of text and image would be most effective. The output generator 1700 would then create a new text post with an accompanying image that resonates with current trends and user preferences.

Throughout this process, the modality agnostic training system 1800 then continuously refines the model's performance, learning from user interactions and feedback across all supported modalities. This allows the system to adapt to changing user preferences and content trends over time, maintaining its effectiveness in analyzing and generating engaging multimodal content.

Figure 14:
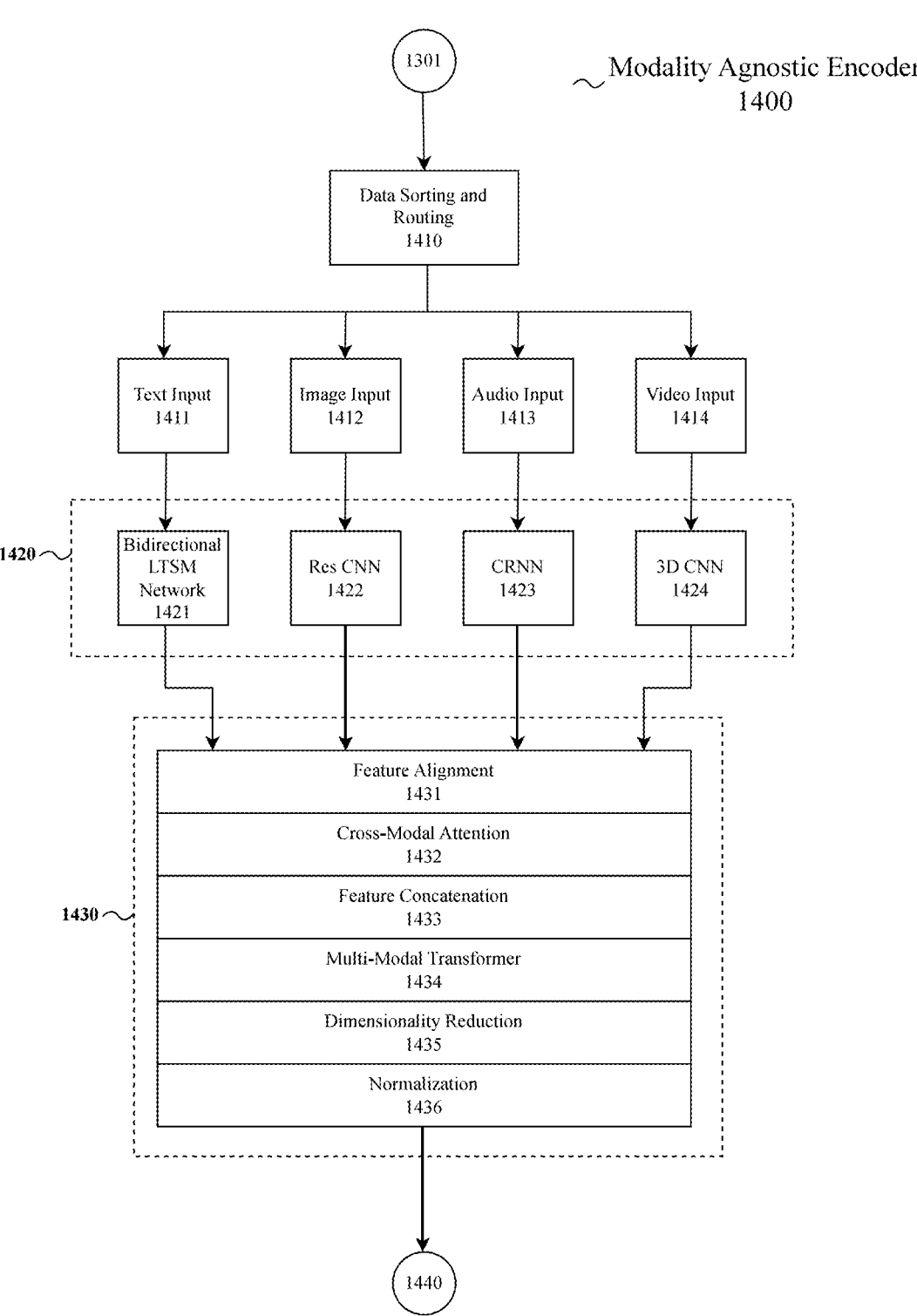
FIG. 14 is a block diagram illustrating an exemplary architecture for the modality agnostic encoder.

FIG. 14 is a block diagram illustrating an exemplary architecture for the modality agnostic encoder 1400. This component processes inputs from various modalities and converts them into a unified representation for further processing by the tokenizer and codeword allocator.

The modality agnostic encoder 1400 receives input data 1301 through a data sorting and routing component 1410. This component analyzes the incoming data and directs it to the appropriate modality-specific channel. The data sorting and routing component 1410 uses a combination of metadata analysis and content-based classification to determine the modality of each input. For text data, it identifies character encodings and language patterns. For images, it examines file headers and pixel data structures. Audio inputs are recognized by their frequency characteristics and file formats. Video data is identified through its combination of visual and audio streams, as well as standard video container formats.

Once the input modality is determined, the data sorting and routing component 1410 directs the input to the appropriate channel: text input channel 1411, image input channel 1412, audio input channel 1413, or video input channel 1414. These channels then feed into their respective initial processing units 1420. The text input channel 1411 processes natural language input using word embeddings and positional encodings. The image input channel 1412 handles visual data using a series of convolutional layers to extract spatial features. The audio input channel 1413 employs a combination of convolutional and recurrent layers to capture temporal and frequency domain features. The video input channel 1414 uses 3D convolutional layers to extract spatio-temporal features.

Separate initial processing units 1420 handle each modality. For text, a bidirectional LSTM network 1421 processes the word embeddings. Images are processed by a ResNet-based convolutional neural network 1422. Audio inputs are analyzed using a convolutional recurrent neural network 1423. Video data is processed by a 3D CNN architecture 1424.

The processed inputs then enter the fusion layer 1430. The feature alignment unit 1431 uses dynamic time warping for temporal alignment of features from different modalities, ensuring synchronization of time-varying inputs. For spatial alignment, it employs a spatial transformer network to align features in a common coordinate system. The cross-modal attention mechanism 1432 implements a multi-head attention architecture. It computes attention weights between features from different modalities using scaled dot-product attention, allowing the model to focus on relevant cross-modal interactions. The feature concatenation unit 1433 combines the aligned and attended features from different modalities into a single tensor, preserving the temporal and spatial structure of the inputs where applicable. The multi-modal transformer 1434 consists of a stack of transformer encoder layers. Each layer includes multi-head self-attention mechanisms and position-wise feed-forward networks. The self-attention allows the model to capture long-range dependencies within and across modalities, while the feed-forward networks introduce non-linearity and increase the model's capacity to learn complex patterns. The dimensionality reduction component 1435 employs a combination of linear projections and non-linear activations to reduce the feature space. It uses a bottleneck architecture similar to autoencoders, where the central layer represents the reduced dimensionality. The normalization component 1436 applies layer normalization to the reduced feature representations. This normalization stabilizes the learning process by normalizing the inputs across the feature dimension, with learnable gain and bias parameters.

The output of the modality agnostic encoder 1400 is a unified representation 1440 that captures information from all input modalities. This representation is a fixed-size tensor where different sections encode information from different modalities, but in a common semantic space. This format allows the subsequent tokenizer 110 and codeword allocator 120 to process the multimodal information uniformly.

This architecture enables the modality agnostic encoder 1400 to effectively integrate information from multiple modalities, creating a unified representation that captures cross-modal relationships and patterns. This approach allows for effective multimodal learning and generation in the subsequent stages of the LCM.

The data flow through the modality agnostic encoder 1400 begins with the input data 1301 entering the data sorting and routing component 1410. This component analyzes and directs the data to the appropriate modality-specific channel (1411-1414). Each channel then feeds its data into the corresponding initial processing unit within 1420. Text data is processed by a bidirectional LSTM network 1421, images by a ResNet-based CNN 1422, audio by a convolutional recurrent neural network 1423, and video by a 3D CNN architecture 1424. The outputs from these processing units then enter the fusion layer 1430, where they undergo feature alignment 1431, cross-modal attention 1432, and feature concatenation 1433. The concatenated features are then processed by the multimodal transformer 1434, followed by dimensionality reduction 1435 and normalization 1436. This series of operations in the fusion layer integrates information from all input modalities into a cohesive representation. Finally, the system outputs a unified representation 1440, which captures the essential information from all input modalities in a format that can be further processed by subsequent components of the larger system.

Figure 15:
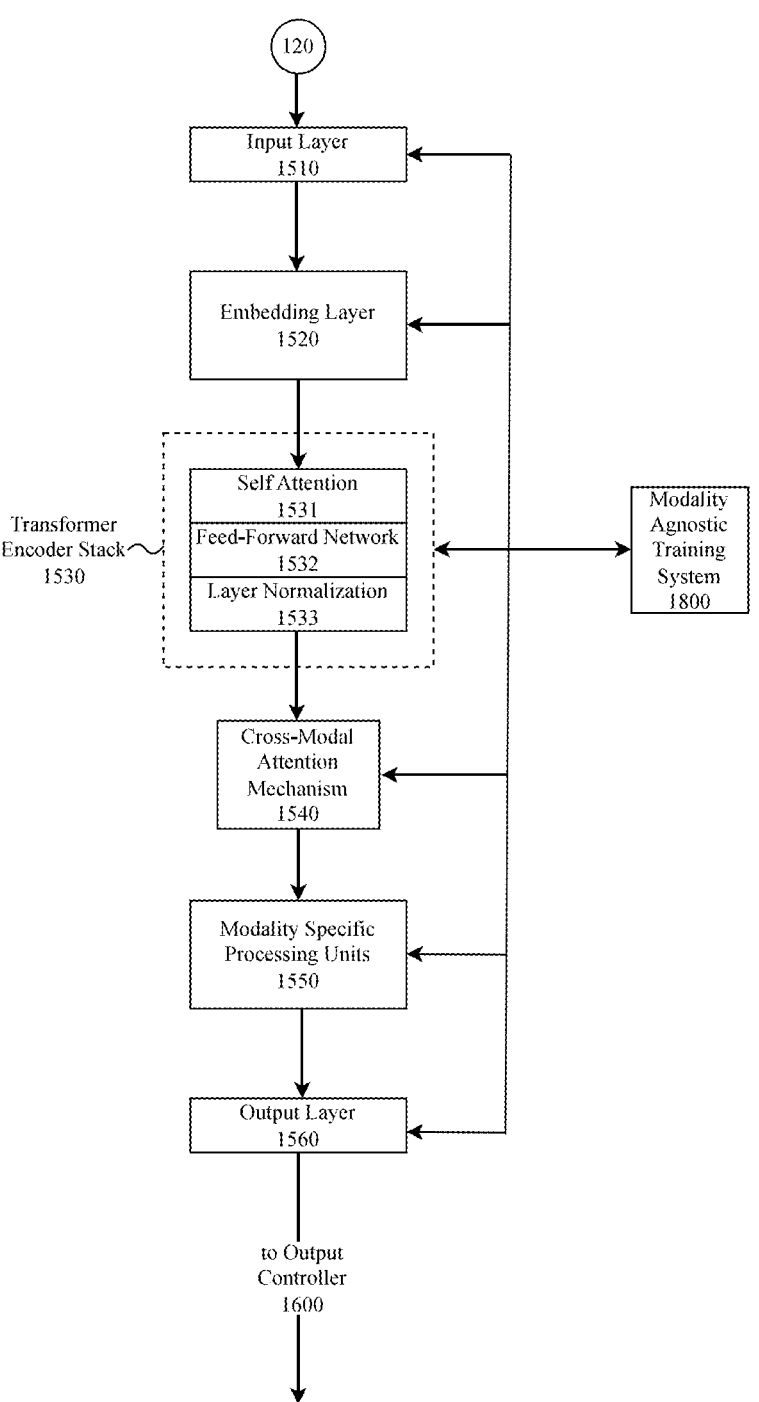
FIG. 15 is a block diagram illustrating an exemplary architecture for multimodal machine learning core.

FIG. 15 is a block diagram illustrating an exemplary architecture for multimodal machine learning core 1500. Multimodal machine learning core 1500 is the central processing unit of the modality agnostic LCM. It consists of several interconnected components that work together to process and integrate information from multiple modalities. The core begins with the input layer 1510, which receives codewords from the codeword allocator 120 and prepares them for subsequent processing. Embedding layer 1520 then transforms these discrete codewords into continuous vector representations, utilizing the unified codebook from subsystem 130 to ensure consistent embeddings across all modalities.

The transformer encoder stack 1530 forms a key part of the architecture, comprising multiple transformer encoder layers. Each layer in this stack includes three main components: a self-attention mechanism 1531 that weighs the importance of different parts of the input sequence, a feedforward network 1532 that applies non-linear transformations to the attended features, and a layer normalization component 1533 that stabilizes training by normalizing the outputs of each sub-layer.

Following the transformer encoder stack, the cross-modal attention mechanism 1540 allows the model to attend to information across different modalities. It receives input from the transformer encoder stack 1530 and integrates information from various input types. The modality-specific processing units 1550 handle specialized operations that may be required for certain tasks, activated or deactivated based on the current requirements.

The output layer 1560 generates the final output of the multimodal machine learning core, which can be either codewords for further processing or task-specific outputs.

The multimodal machine learning core 1500 interacts with other system components, receiving input codewords from the codeword allocator 120, using the unified codebook from subsystem 130, sending output to the output controller 1600, and interacting with the modality agnostic training system 1800 during training.

The data flow through the multimodal machine learning core 1500 begins when input codewords are received from the codeword allocator 120 at the input layer 1510. These codewords are then passed to embedding layer 1520, which transforms them into continuous vector representations using the unified codebook from subsystem 130. The embedded vectors then flow through the transformer encoder stack 1530, where they undergo successive transformations through the self-attention mechanism 1531, feedforward network 1532, and layer normalization 1533 in each encoder layer. The output from the transformer encoder stack 1530 is then processed by the cross-modal attention mechanism 1540, which integrates information across different modalities. If necessary, the data then flows through modality-specific processing units 1550 for any specialized operations. The processed information is then sent to the output layer 1560, which generates the final output of the core. The final output from layer 1560 is then sent to output controller 1600 for further processing and generation of the final system outputs. During training, the modality agnostic training system 1800 interacts with all components of the core, providing updates and optimization signals to refine the model's performance across multiple modalities.

Figure 16:
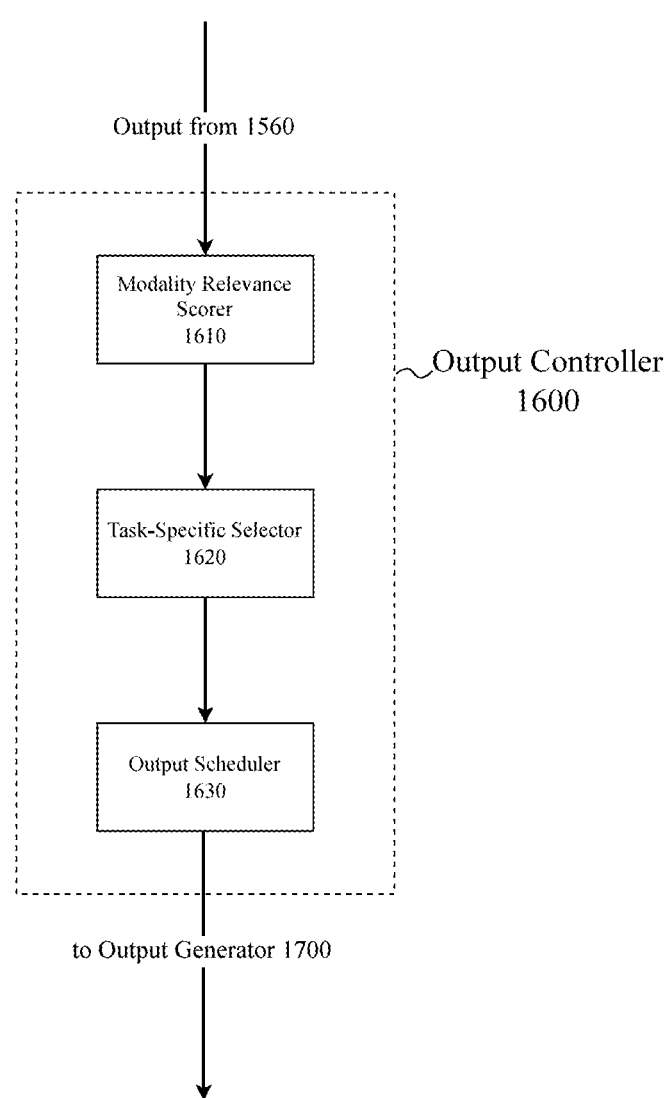
FIG. 16 is a block diagram illustrating an exemplary architecture for output controller.

FIG. 16 is a block diagram illustrating exemplary architecture of output controller 1600. output controller 1600 receives input from multimodal machine learning core 1500 in the form of processed codeword representations. The main components of output controller 1600 includes modality relevance scorer 1610, task-specific selector 1620, and output scheduler 1630.

Modality relevance scorer 1610 employs a neural network-based approach to evaluate the relevance of each output modality. It processes the input codeword representation through a series of dense layers, each followed by a non-linear activation function. The final layer outputs a relevance score for each potential output modality. This scorer also considers historical data on successful modality combinations for similar inputs, utilizing a memory bank of past interactions to inform its decisions. Additionally, it incorporates a context-aware attention mechanism that allows it to focus on different aspects of the input representation when scoring each modality.

Task-specific selector 1620 utilizes a rule-based system in combination with a machine learning model to make its selections. The rule-based component enforces hard constraints, such as user-specified preferences or system limitations. The machine learning model, for example a gradient boosted decision tree, considers the relevance scores from 1610, the current task parameters, and contextual information to make nuanced decisions about modality selection. This hybrid approach allows for both explicit control and learned behavior, making the selector adaptable to various scenarios while still respecting predefined constraints.

Output scheduler 1630 implements a dynamic programming algorithm to optimize the sequence and timing of multi-modal outputs. It constructs a dependency graph representing the relationships and potential conflicts between different modality outputs. Using this graph, it calculates the optimal schedule that minimizes overall output time while maintaining coherence across modalities. The scheduler also incorporates a real-time adjustment mechanism, allowing it to modify the output sequence on-the-fly based on feedback or changing conditions. This component ensures that multi-modal outputs are not only logically ordered but also optimized for the user's consumption and understanding.

The data flow in output controller 1600 begins when it receives the processed codeword representation from multimodal machine learning core 1500. This input is a high-dimensional vector or tensor that encodes the semantic content and context of the intended output.

Initially, this input is fed into modality relevance scorer 1610. Here, the codeword representation is processed through its neural network architecture. The network's layers extract relevant features and patterns from the input, ultimately producing a set of relevance scores for each potential output modality. These scores are normalized to values between 0 and 1, indicating the relative importance of each modality for the current output.

The relevance scores, along with the original input representation, are then passed to task-specific selector 1620. This component also receives additional inputs including the current task parameters and any user-specified constraints. The selector's rule-based system first applies any hard constraints, potentially eliminating certain modalities from consideration. The remaining data is then processed by the machine learning model, which combines the relevance scores, task parameters, and contextual information to make a final selection of which modalities to activate.

The output of task-specific selector 1620, which includes the selected modalities and their associated portions of the input representation, is then forwarded to output scheduler 1630. The scheduler uses this information to construct its dependency graph, representing how the selected modalities relate to and depend on each other. The dynamic programming algorithm then processes this graph to determine the optimal sequence and timing for generating each modality's output.

Finally, output scheduler 1630 prepares a series of control signals. These signals contain information about which output generators 1700 should be activated, in what order, and with what timing. Each control signal also includes the relevant portion of the original input representation needed for that specific output generator.

These control signals are then sent to the respective output generators 1700, initiating the process of generating the multi-modal output. Output controller 1600 continues to monitor the generation process, ready to make real-time adjustments to the schedule if necessary based on feedback from the output generators or changes in the system state.

Figure 17:
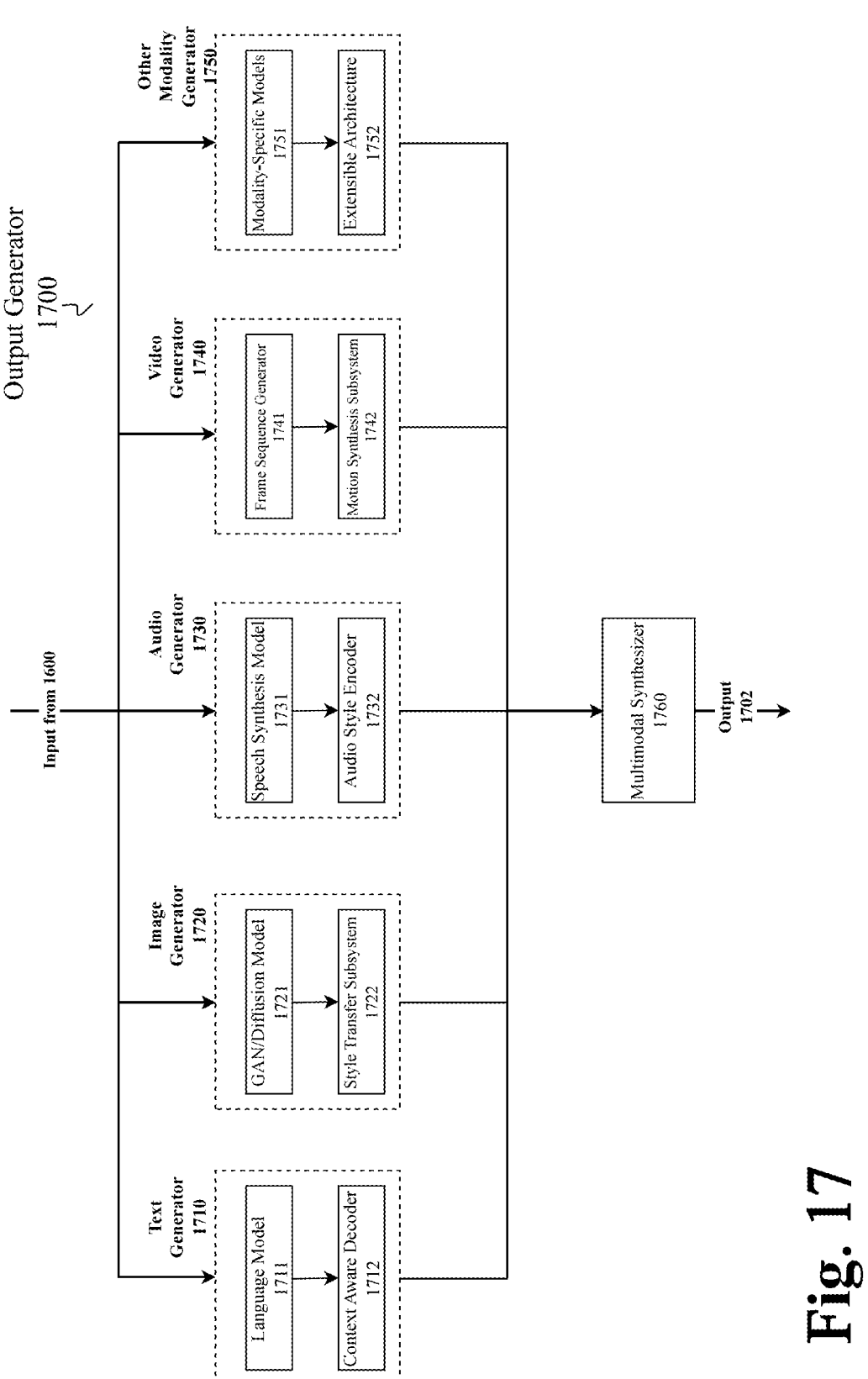
FIG. 17 is a block diagram illustrating exemplary architecture of output generator.

FIG. 17 is a block diagram illustrating exemplary architecture of output generator 1700. Output generator 1700 receives input from output controller 1600 in the form of control signals and relevant portions of the processed codeword representation. output generator 1700 comprises several specialized decoders for different modalities, including text generator 1710, image generator 1720, audio generator 1730, video generator 1740, and other modality generator 1750.

Text generator 1710 consists of language model 1711 and context-aware decoder 1712. language model 1711 is responsible for generating coherent and contextually appropriate text based on the input representation. It utilizes a transformer-based architecture to process the input and generate text outputs. The context-aware decoder 1712 works in conjunction with the language model to ensure that the generated text aligns with the overall context of the multi-modal output.

For text generator 1710, language model 1711 is pre-trained on large corpora of text data from diverse sources, including books, articles, and websites. It is then fine-tuned on domain-specific text data relevant to the system's applications. context-aware decoder 1712 is trained on paired data of input contexts and appropriate textual responses, allowing it to learn contextual relevance.

Image generator 1720 incorporates GAN/diffusion model 1721 and style transfer subsystem 1722. GAN/diffusion model 1721 creates high-quality images based on the input representation, using advanced generative techniques to produce realistic and detailed visual outputs. style transfer subsystem 1722 allows for the generation of images in specific styles or artistic renditions, adapting the output to match desired aesthetic qualities.

Image generator 1720's GAN/diffusion model 1721 is trained on large datasets of images, encompassing a wide range of subjects and styles. The training process involves alternating between generating images and discriminating between real and generated images. style transfer subsystem 1722 is trained on paired data of content images and style images, learning to apply diverse artistic styles to any given content.

Audio generator 1730 includes a speech synthesis model 1731 and audio style encoder 1732. speech synthesis model 1731 converts text or abstract representations into natural-sounding speech, utilizing advanced text-to-speech technologies. audio style encoder 1732 enables the generation of audio with specific characteristics, such as different voice styles or emotional tones.

For audio generator 1730, speech synthesis model 1731 is trained on large datasets of paired text and audio recordings, learning to map textual representations to speech. audio style encoder 1732 is trained on diverse audio samples with labeled style characteristics, enabling it to reproduce various voice types and emotional tones.

Video generator 1740 consists of frame sequence generator 1741 and a motion synthesis subsystem 1742. frame sequence generator 1741 creates a series of video frames based on the input representation, establishing the visual content of the video output. motion synthesis subsystem 1742 ensures smooth and realistic motion between frames, creating coherent and natural-looking video sequences.

Video generator 1740's frame sequence generator 1741 is trained on large video datasets, learning to generate coherent sequences of frames from abstract representations. motion synthesis subsystem 1742 is trained on high-frame-rate video data, focusing on learning natural motion patterns between keyframes.

Other modality generator 1750 is designed to accommodate additional or future modalities. It includes modality-specific models 1751 and extensible architecture 1752. modality-specific models 1751 are placeholder components for specialized generators for other types of outputs, such as haptic feedback or 3D models. extensible architecture 1752 allows for easy integration of new modalities as the system evolves, ensuring flexibility and futureproofing of the output generator. other modality generator 1750's modality-specific models 1751 are trained on data relevant to their respective modalities. For example, a haptic feedback model is trained on data mapping visual or auditory events to appropriate tactile sensations. extensible architecture 1752 is designed to accommodate various training paradigms, allowing for the integration of new modalities with minimal architectural changes.

Multi-modal synthesizer 1760 is responsible for integrating the outputs from the various specialized generators (text generator 1710, image generator 1720, audio generator 1730, video generator 1740, and other modality generator 1750) into a cohesive, synchronized multi-modal output. It receives the individual outputs from each activated generator and combines them based on the instructions received from the output controller 1600.

Multi-modal synthesizer 1760 employs advanced algorithms to ensure temporal and spatial alignment of the different modality outputs. These advanced algorithms include, for example, dynamic time warping (DTW) for temporal alignment of audio and video, spatial registration algorithms like RANSAC for proper overlay of visual elements, cross-modal attention mechanisms inspired by transformer architectures to understand relationships between modalities, and graph-based algorithms to efficiently process the complex relationships between different modality outputs. Additionally, the synthesizer utilizes reinforcement learning algorithms for its conflict resolution mechanism, learning optimal strategies for resolving contradictions between modalities. For instance, it synchronizes audio with video frames, overlays text on images or video at appropriate times and ensures that haptic feedback (if present) is coordinated with visual or auditory events. It also handles any necessary format conversions to ensure compatibility between the different modality outputs.

Additionally, multi-modal synthesizer 1760 includes a conflict resolution mechanism to handle cases where outputs from different modalities might contradict or interfere with each other. It uses a set of predefined rules and learned patterns to make decisions about how to resolve such conflicts, ensuring the final output is coherent and consistent across all modalities.

Multi-modal synthesizer 1760 is trained on datasets of well-formed multi-modal content, learning to replicate the timing, synchronization, and integration patterns found in high-quality multi-modal presentations. This training allows it to produce natural and effective combinations of different modality outputs.

The data flow in output generator 1700 begins when it receives input from output controller 1600. This input consists of control signals and relevant portions of the processed codeword representation. The control signals determine which specialized decoders should be activated and how they should coordinate their outputs.

For text generator 1710, the input first passes through the language model 1711. This model processes the codeword representation, generating a sequence of words or subwords. This sequence is then fed into the context-aware decoder 1712, which refines the output, ensuring it aligns with the broader context of the multi-modal output. The final text output is then prepared for integration with other modalities.

In image generator 1720, the input is processed by the GAN/diffusion model 1721. This model iteratively refines a random noise input into a coherent image based on the codeword representation. The resulting image is then passed through the style transfer subsystem 1722, which applies specified style characteristics. The styled image is then ready for output or further integration.

For audio generator 1730, the input is first processed by the speech synthesis model 1731, converting the abstract representation into a sequence of audio features. These features are then passed through the audio style encoder 1732, which modifies the audio characteristics according to specified style parameters. The result is a final audio output ready for playback or integration with other modalities.

In video generator 1740, frame sequence generator 1741 first processes the input to create a series of keyframes. These keyframes and the original input are then fed into motion synthesis subsystem 1742, which generates intermediate frames to create smooth motion. The result is a complete video sequence.

For other modality generator 1750, the data flow depends on the specific modality being generated. The input is directed to the appropriate modality-specific model 1751, which processes it according to the requirements of that modality. Extensible architecture 1752 ensures that this process can be smoothly integrated with the rest of the system, regardless of the specific modality.

Multi-modal synthesizer 1760 acts as the final stage before the output is released. It receives the individual outputs from each activated generator, processes them through its integration algorithms, and produces the final, synthesized multi-modal output. This output 1702 is then ready for presentation to the user or for further processing by other parts of the larger system.

Figure 18:
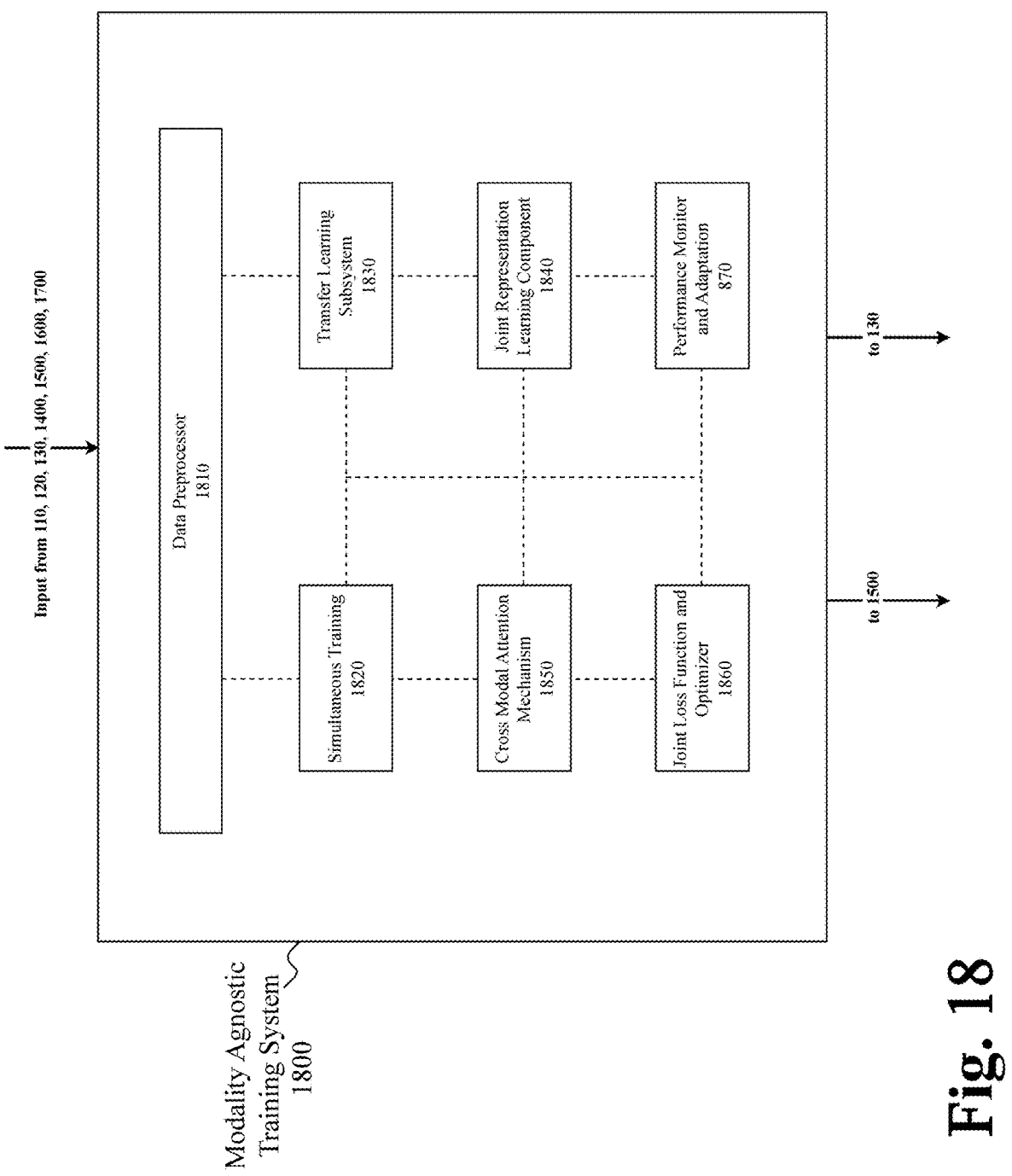
FIG. 18 is a block diagram illustrating exemplary architecture of modality agnostic training system.

FIG. 18 is a block diagram illustrating exemplary architecture of modality agnostic training system 1800. The system receives input from multiple components, including the modality-agnostic encoder 1400, tokenizer 110, codeword allocator 120, unified codebook generation subsystem 130, and multimodal machine learning core 1500. Modality agnostic training system 1800 employs various machine learning techniques and is trained on diverse datasets to ensure robust performance across modalities. For text data, it utilizes large-scale corpora from sources such as books, articles, and websites, often pre-processed using techniques like tokenization and word embedding. Image data training involves datasets of labeled images, ranging from simple object recognition tasks to complex scene understanding. For audio, the system trains on datasets including speech recordings, music, and environmental sounds, often preprocessed into spectrograms or other frequency-domain representations. Video data training combines elements of image and audio processing, with datasets including action recognition, object tracking, and scene segmentation tasks.

The training process typically involves supervised learning, where the system learns from labeled examples, as well as unsupervised and self-supervised learning techniques to leverage large amounts of unlabeled data. Transfer learning is extensively used, allowing the system to apply knowledge gained from one task or modality to another. The training process also incorporates techniques like curriculum learning, where the system is presented with increasingly complex tasks, and adversarial training to improve robustness.

To handle the computational demands of training on such diverse and large-scale datasets, the system utilizes distributed computing techniques, often leveraging GPU clusters or specialized AI hardware. The training process is iterative, with continuous evaluation and fine-tuning based on performance metrics across different modalities and tasks.

The data preprocessor 1810 is responsible for preparing multimodal input data for training. It applies techniques such as, for example, normalization, scaling, and alignment to ensure data from different modalities are compatible. For text data, it performs for example tokenization and padding. For image data it, for example, resizes and normalizes pixel values. Audio data, for example, undergoes spectral analysis and time-alignment. The preprocessor also handles missing data and ensures consistent formatting across all modalities.

The simultaneous training subsystem 1820 enables concurrent learning from multiple modalities. It implements a multi-task learning framework where each modality is treated as a separate but related task. This subsystem uses gradient balancing techniques to ensure that no single modality dominates the learning process. It employs techniques such as, for example, gradient normalization or adaptive loss weighting to maintain equilibrium between different data types during backpropagation.

The transfer learning subsystem 1830 facilitates knowledge transfer between modalities. It utilizes techniques such as domain adaptation and fine-tuning to apply knowledge from a source modality to a target modality. This subsystem might use methods like adversarial training to align feature distributions between modalities or employ meta-learning algorithms to quickly adapt to new modalities with limited data.

The joint representation learning component 1840 works to create a shared semantic space across all modalities. It employs techniques such as, for example, canonical correlation analysis or shared autoencoders to learn aligned representations. This component uses, for example, contrastive learning approaches to ensure that similar concepts across modalities are mapped close together in the unified codebook space.

The cross-modal attention mechanism 1850 allows the model to focus on relevant information across different modalities during training. It implements multi-head attention mechanisms that can attend to features from various modalities simultaneously. This subsystem might use techniques like co-attention or hierarchical attention to capture complex inter-modal relationships.

The joint loss function and optimizer 1860 calculates a combined loss across all modalities and tasks. It employs, for example, techniques like uncertainty weighting to automatically balance different loss terms. The optimizer could use adaptive learning rate methods like Adam or RMSprop, with additional logic to handle multi-modal data. This subsystem also implements gradient accumulation and normalization techniques to handle varying batch sizes across modalities.

The performance monitoring and adaptation subsystem 1870 continuously evaluates system performance. It tracks various metrics for each modality and task, such as accuracy, perplexity, or mean squared error. This subsystem implements early stopping mechanisms and learning rate scheduling. It also uses, for example, Bayesian optimization or reinforcement learning techniques to dynamically adjust hyperparameters during training.

The output of modality agnostic training system 1800 is used to update the multimodal machine learning core 1500 and the unified codebook generation subsystem 130, ensuring continuous improvement in multimodal processing and representation.

The data flow through modality agnostic training system 1800 begins with inputs from multiple sources. The system receives data from modality-agnostic encoder 1400, tokenizer 110, codeword allocator 120, unified codebook generation subsystem 130, and multimodal machine learning core 1500. These inputs represent various aspects of multimodal data and its current processing state.

Initially, all incoming data passes through data preprocessor 1810. This component harmonizes the diverse inputs, ensuring they are in a consistent format for further processing. The preprocessed data then flows into several components operating in parallel.

Simultaneous training subsystem 1820 receives the preprocessed data and coordinates the concurrent learning process across all modalities. It interacts closely with joint representation learning component 1840, which works to create unified representations of multimodal data.

Concurrently, transfer learning subsystem 1830 analyzes data to identify opportunities for knowledge transfer between modalities. It communicates with both simultaneous training subsystem 1820 and joint representation learning component 1840 to facilitate this transfer.

Cross-modal attention mechanism 1850 receives input from joint representation learning component 1840 and simultaneous training subsystem 1820. It processes this information to determine relevant cross-modal relationships, feeding its output back to these components to refine their operations.

Data from all these components flows into joint loss function and optimizer 1860. This subsystem calculates the overall loss and optimizes the model parameters across all modalities simultaneously. The optimized parameters are then fed back into the various components of the system. Throughout this process, performance monitoring and adaptation subsystem 1870 observes the data flow and system performance. It receives input from all other components and provides feedback to adjust their operations as needed.

Finally, the processed and optimized data flows out of the system in two streams. One stream goes to multimodal machine learning core 1500, updating its parameters and improving its multimodal processing capabilities. The other stream feeds back to unified codebook generation subsystem 130, refining the codebook based on the learned cross-modal relationships. This cyclical flow of data allows the system to continuously learn and improve its performance across all modalities, ensuring a truly modality-agnostic training process.

FIG. 19 is a method diagram illustrating the use of modality agnostic LCM for deep learning. The process begins by receiving input data 1301 of various modalities through the input component. This data can include text, images, audio, video, or any other structured or unstructured format, allowing the system to handle diverse types of information 1901. The input data is then processed through the modality agnostic encoder 1400, which employs advanced neural network architectures to convert inputs from different modalities into a unified representation. This unified representation preserves the essential features of each modality while enabling cross-modal processing 1902.

The unified representation is then tokenized into source-blocks using the tokenizer 110 1903. This component employs sophisticated algorithms to split the data into meaningful semantic units, capturing the inherent structure and patterns across different modalities. Following tokenization, the codeword allocator 120 assigns unique codewords to each sourceblock. This assignment is based on the unified codebook generated by subsystem 130, which maintains a comprehensive mapping between sourceblocks and codewords across all supported modalities 1904.

The assigned codewords are then processed through the multimodal machine learning core 1500 1905. This advanced core utilizes state-of-the-art deep learning architectures, such as transformer networks or variational autoencoders, to learn complex patterns and relationships across multiple modalities simultaneously. Using the trained multimodal machine learning core, the system generates a codeword response. This response encapsulates the processed information in a compact, codeword format that preserves the multimodal nature of the input 1906.

The output controller 1600 then determines the appropriate output modalities based on the generated codeword response 1907. This component employs sophisticated decision-making algorithms to select the most relevant and effective output types, considering factors such as the input modalities, task requirements, and user preferences. Based on the output controller's decision, the output generator 1700 produces the final output in the chosen modalities 1908. This component utilizes specialized decoders for each modality, ensuring high-quality generation of text, images, audio, video, or any required combination.

Finally, the entire system undergoes continuous improvement through the modality agnostic training system 1800

1909. This component implements advanced machine learning techniques to enable simultaneous training on multiple modalities, facilitate transfer learning between different domains, and learn joint representations that capture cross-modal relationships.

This ongoing training process ensures that the system constantly adapts to new data and improves its performance across all supported modalities.

Exemplary Computing Environment

Figure 20:
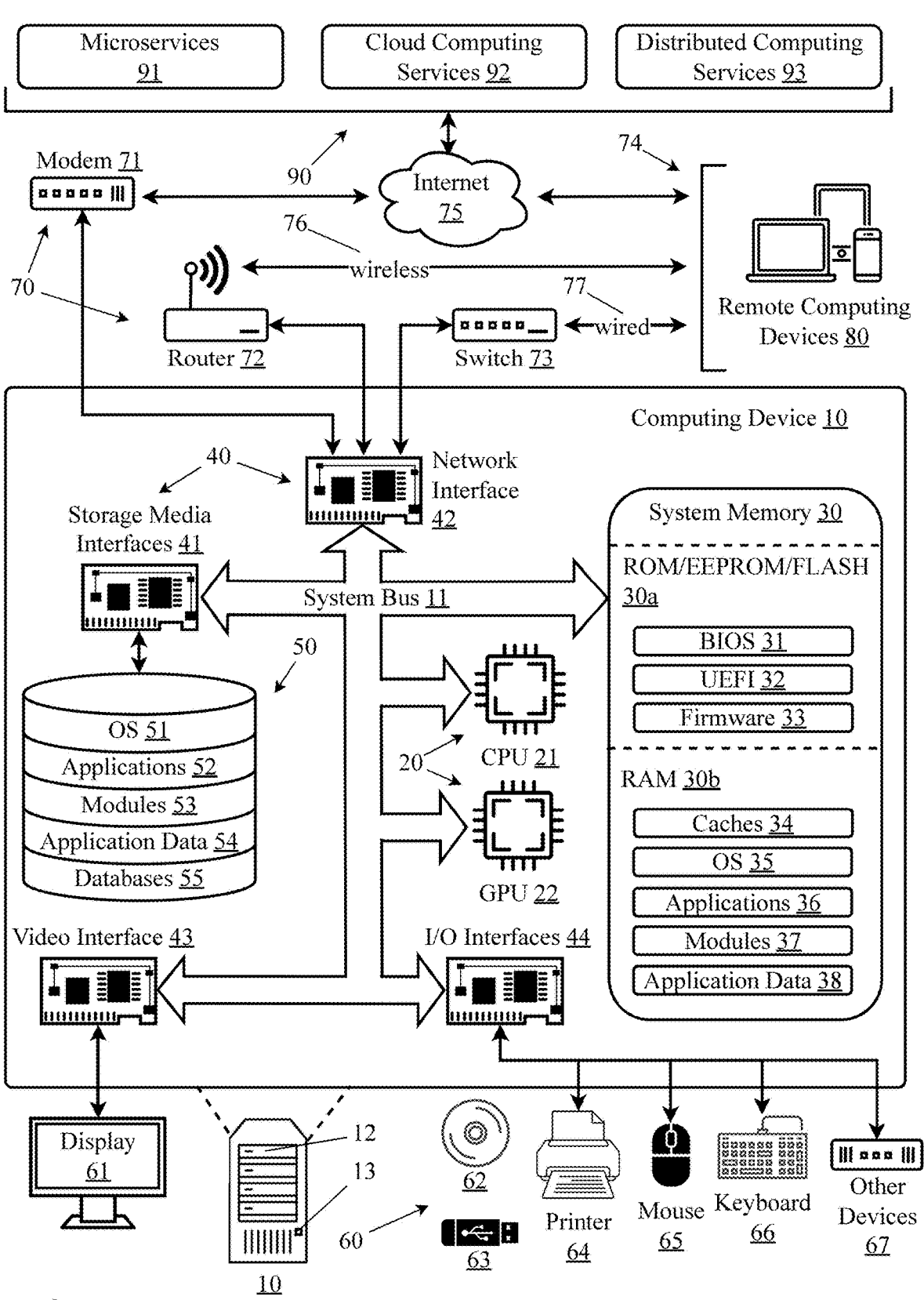
FIG. 20 illustrates an exemplary computing environment on which an embodiment described herein may be implemented.

FIG. 20 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions based on technologies like complex instruction set computer (CISC) or reduced instruction set computer (RISC). Further, computing device 10 may comprise one or more specialized processors such as a graphics processing unit (GPU) 22 configured to accelerate processing of computer graphics and images via a large array of specialized processing cores arranged in parallel. Further computing device 10 may be comprised of one or more specialized processes such as Intelligent Processing Units, field-programmable gate arrays or application-specific integrated circuits for specific tasks or types of tasks. The term processor may further include: neural processing units (NPUs) or neural computing units optimized for machine learning and artificial intelligence workloads using specialized architectures and data paths; tensor processing units (TPUs) designed to efficiently perform matrix multiplication and convolution operations used heavily in neural networks and deep learning applications; application-specific integrated circuits (ASICs) implementing custom logic for domain-specific tasks; application-specific instruction set processors (ASIPs) with instruction sets tailored for particular applications; field-programmable gate arrays (FPGAs) providing reconfigurable logic fabric that can be customized for specific processing tasks; processors operating on emerging computing paradigms such as quantum computing, optical computing, mechanical computing (e.g., using nanotechnology entities to transfer data), and so forth. Depending on configuration, computing device 10 may comprise one or more of any of the above types of processors in order to efficiently handle a variety of general purpose and specialized computing tasks. The specific processor configuration may be selected based on performance, power, cost, or other design constraints relevant to the intended application of computing device 10.

System memory 30 is processor-accessible data storage in the form of volatile and/or nonvolatile memory. System memory 30 may be either or both of two types: non-volatile memory and volatile memory. Non-volatile memory 30a is not erased when power to the memory is removed, and includes memory types such as read only memory (ROM), electronically-erasable programmable memory (EEPROM), and rewritable solid state memory (commonly known as "flash memory"). Non-volatile memory 30a is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30a may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30b is erased when power to the memory is removed and is typically used for short-term storage of data for processing. Volatile memory 30b includes memory types such as random-access memory (RAM), and is normally the primary operating memory into which the operating system 35, applications 36, program modules 37, and application data 38 are loaded for execution by processors 20. Volatile memory 30b is generally faster than non-volatile memory 30a due to its electrical characteristics and is directly accessible to processors 20 for processing of instructions and data storage and retrieval. Volatile memory 30b may comprise one or more smaller cache memories which operate at a higher clock speed and are typically placed on the same IC as the processors to improve performance.

There are several types of computer memory, each with its own characteristics and use cases. System memory 30 may be configured in one or more of the several types described herein, including high bandwidth memory (HBM) and advanced packaging technologies like chip-on-wafer-on-substrate (CoWoS). Static random access memory (SRAM) provides fast, low-latency memory used for cache memory in processors, but is more expensive and consumes more power compared to dynamic random access memory (DRAM). SRAM retains data as long as power is supplied. DRAM is the main memory in most computer systems and is slower than SRAM but cheaper and more dense. DRAM requires periodic refresh to retain data. NAND flash is a type of non-volatile memory used for storage in solid state drives (SSDs) and mobile devices and provides high density and lower cost per bit compared to DRAM with the trade-off of slower write speeds and limited write endurance. HBM is an emerging memory technology that provides high bandwidth and low power consumption which stacks multiple DRAM dies vertically, connected by through-silicon vias (TSVs). HBM offers much higher bandwidth (up to 1 TB/s) compared to traditional DRAM and may be used in high-performance graphics cards, AI accelerators, and edge computing devices. Advanced packaging and CoWoS are technologies that enable the integration of multiple chips or dies into a single package. CoWoS is a 2.5D packaging technology that interconnects multiple dies side-by-side on a silicon interposer and allows for higher bandwidth, lower latency, and reduced power consumption compared to traditional PCB-based packaging. This technology enables the integration of heterogeneous dies (e.g., CPU, GPU, HBM) in a single package and may be used in high-performance computing, AI accelerators, and edge computing devices.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. In some high-performance computing systems, multiple GPUs may be connected using NVLink bridges, which provide high-bandwidth, low-latency interconnects between GPUs. NVLink bridges enable faster data transfer between GPUs, allowing for more efficient parallel processing and improved performance in applications such as machine learning, scientific simulations, and graphics rendering. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44. Network interface 42 may support various communication standards and protocols, such as Ethernet and Small Form-Factor Pluggable (SFP). Ethernet is a widely used wired networking technology that enables local area network (LAN) communication. Ethernet interfaces typically use RJ45 connectors and support data rates ranging from 10 Mbps to 100 Gbps, with common speeds being 100 Mbps, 1 Gbps, 10 Gbps, 25 Gbps, 40 Gbps, and 100 Gbps. Ethernet is known for its reliability, low latency, and cost-effectiveness, making it a popular choice for home, office, and data center networks. SFP is a compact, hot-pluggable transceiver used for both telecommunication and data communications applications. SFP interfaces provide a modular and flexible solution for connecting network devices, such as switches and routers, to fiber optic or copper networking cables. SFP transceivers support various data rates, ranging from 100 Mbps to 100 Gbps, and can be easily replaced or upgraded without the need to replace the entire network interface card. This modularity allows for network scalability and adaptability to different network requirements and fiber types, such as single-mode or multi-mode fiber.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may be implemented using various technologies, including hard disk drives (HDDs) and solid-state drives (SSDs). HDDs use spinning magnetic platters and read/write heads to store and retrieve data, while SSDs use NAND flash memory. SSDs offer faster read/write speeds, lower latency, and better durability due to the lack of moving parts, while HDDs typically provide higher storage capacities and lower cost per gigabyte. NAND flash memory comes in different types, such as Single-Level Cell (SLC), Multi-Level Cell (MLC), Triple-Level Cell (TLC), and Quad-Level Cell (QLC), each with trade-offs between performance, endurance, and cost. Storage devices connect to the computing device 10 through various interfaces, such as SATA, NVMe, and PCIe. SATA is the traditional interface for HDDs and SATA SSDs, while NVMe (Non-Volatile Memory Express) is a newer, high-performance protocol designed for SSDs connected via PCIe. PCIe SSDs offer the highest performance due to the direct connection to the PCIe bus, bypassing the limitations of the SATA interface. Other storage form factors include M.2 SSDs, which are compact storage devices that connect directly to the motherboard using the M.2 slot, supporting both SATA and NVMe interfaces. Additionally, technologies like Intel Optane memory combine 3D XPoint technology with NAND flash to provide high-performance storage and caching solutions. Non-volatile data storage devices 50 may be non-removable from computing device 10, as in the case of internal hard drives, removable from computing device 10, as in the case of external USB hard drives, or a combination thereof. However, computing devices will typically comprise one or more internal, non-removable hard drives using either magnetic disc or solid-state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, object oriented databases, NoSQL databases, vector databases, knowledge graph databases, key-value databases, document oriented data stores, and graph databases.

Applications (also known as computer software or software applications) are sets of programming instructions designed to perform specific tasks or provide specific functionality on a computer or other computing devices. Applications are typically written in high-level programming languages such as C, C++, Scala, Erlang, GoLang, Java, Scala, Rust, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems facilitated by specifications such as containerd.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network or optical transmitters (e.g., lasers). Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers or networking functions may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices or intermediate networking equipment (e.g., for deep packet inspection).

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90. Also, certain processing subtasks may be sent to a microservice 91 for processing with the result being transmitted to computing device 10 for incorporation into a larger processing task. Infrastructure as Code (IaaC) tools like Terraform can be used to manage and provision computing resources across multiple cloud providers or hyperscalers. This allows for workload balancing based on factors such as cost, performance, and availability. For example, Terraform can be used to automatically provision and scale resources on AWS spot instances during periods of high demand, such as for surge rendering tasks, to take advantage of lower costs while maintaining the required performance levels. In the context of rendering, tools like Blender can be used for object rendering of specific elements, such as a car, bike, or house. These elements can be approximated and roughed in using techniques like bounding box approximation or low-poly modeling to reduce the computational resources required for initial rendering passes. The rendered elements can then be integrated into the larger scene or environment as needed, with the option to replace the approximated elements with higher-fidelity models as the rendering process progresses.

In an implementation, the disclosed systems and methods may utilize, at least in part, containerization techniques to execute one or more processes and/or steps disclosed herein. Containerization is a lightweight and efficient virtualization technique that allows you to package and run applications and their dependencies in isolated environments called containers. One of the most popular containerization platforms is containerd, which is widely used in software development and deployment. Containerization, particularly with open-source technologies like containerd and container orchestration systems like Kubernetes, is a common approach for deploying and managing applications. Containers are created from images, which are lightweight, standalone, and executable packages that include application code, libraries, dependencies, and runtime. Images are often built from a containerfile or similar, which contains instructions for assembling the image. Containerfiles are configuration files that specify how to build a container image. Systems like Kubernetes natively support containerd as a container runtime. They include commands for installing dependencies, copying files, setting environment variables, and defining runtime configurations. Container images can be stored in repositories, which can be public or private. Organizations often set up private registries for security and version control using tools such as Harbor, JFrog Artifactory and Bintray, GitLab Container Registry, or other container registries. Containers can communicate with each other and the external world through networking. Containerd provides a default network namespace, but can be used with custom network plugins. Containers within the same network can communicate using container names or IP addresses.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, mainframe computers, network nodes, virtual reality or augmented reality devices and wearables, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are serverless logic apps, microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP, protobuffers, gRPC or message queues such as Kafka. Microservices 91 can be combined to perform more complex or distributed processing tasks. In an embodiment, Kubernetes clusters with containerized resources are used for operational packaging of system.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over public or private networks or the Internet on a subscription or alternative licensing basis, or consumption or ad-hoc marketplace basis, or combination thereof.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power or support for highly dynamic compute, transport or storage resource variance or uncertainty over time requiring scaling up and down of constituent system resources. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, NVLink or other GPU-to-GPU high bandwidth communications links and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

The skilled person will be aware of a range of possible modifications of the various aspects described above. Accordingly, the present invention is defined by the claims and their equivalents.

What is claimed is:

1. A system for a generic compound large codeword model for natively multimodal deep learning, comprising one or more computers with executable instructions that, when executed, cause the system to:

receive a plurality of inputs of different modalities;

convert the plurality of inputs to a unified representation using a modality-agnostic encoder prior to tokenization, wherein the unified representation is a fixed-size tensor in which different sections encode information from different modalities in a common semantic space;

tokenize the unified representation into a plurality of sourceblocks;

assign the plurality of sourceblocks a plurality of codewords, where each sourceblock is mapped to a particular codeword through a unified codebook that is prefix-free and entropy-coded using Huffman or arithmetic coding, wherein the unified codebook is stored in a codebook library;

cluster the plurality of codewords based on semantic similarity and learn a single embedding vector for each codeword cluster rather than learning embeddings for individual codewords, thereby reducing the number of embedding vectors processed by the multimodal machine learning core;

process the plurality of codewords through a multimodal machine learning core comprising an embedding layer and a cross-modal attention mechanism configured to operate on the cluster-level embedding vectors in the shared semantic space;

generate a codeword response to the plurality of inputs using the multimodal machine learning core;

translate the codeword response into a translated response which matches one or more modalities of the inputs; and train the multimodal machine learning core simultaneously on the multiple modalities using a joint loss function that applies uncertainty weighting to automatically balance training contributions from the different modalities within the multimodal machine learning core.

2. The system of claim 1, wherein the multimodal machine learning core has a transformer-based machine learning architecture.

3. The system of claim 1, wherein the multimodal machine learning core has a variational autoencoder-based machine learning architecture.

4. The system of claim 1, wherein the multimodal machine learning core has a recurrent neural network-based machine learning architecture.

5. The system of claim 1, further comprising a plurality of unified codebooks and a plurality of multimodal machine learning cores, wherein each unified codebook and multimodal machine learning core is configured to process inputs of different modalities.

6. The system of claim 5, further comprising a codeword translator which translates codewords between any plurality of modalities.

7. The system of claim 1, wherein the embedding layer is a unified embedding layer that maps codewords from all modalities using a single set of learned embedding parameters.

8. The system of claim 1, wherein the plurality of inputs comprises at least two of: text data, image data, audio data, and video data.

9. The system of claim 1, wherein the unified codebook is capable of mapping sourceblocks from multiple modalities to codewords within a shared codeword space.

10. The system of claim 1, wherein the modality-agnostic encoder comprises modality-specific processing channels that feed into a fusion layer, the fusion layer combining outputs from the modality specific processing channels into the unified representation.

11. The system of claim 1, wherein the system is configured to perform transfer learning between different modalities using the unified codeword representation.

12. The system of claim 1, wherein the system is configured to generate outputs in multiple modalities based on a single codeword response.

13. A method for a generic compound large codeword model for natively multimodal deep learning, comprising the steps of:

receiving a plurality of inputs of different modalities;

converting the plurality of inputs to a unified representation using a modality-agnostic encoder prior to tokenization, wherein the unified representation is a fixed-size tensor in which different sections encode information from different modalities in a common semantic space;

tokenizing the unified representation into a plurality of sourceblocks;

assigning the plurality of sourceblocks a plurality of codewords, where each sourceblock is mapped to a particular codeword through a unified codebook that is prefix-free and entropy-coded using Huffman or arithmetic coding, wherein the unified codebook is stored in a codebook library;

clustering the plurality of codewords based on semantic similarity and learn a single embedding vector for each codeword cluster rather than learning embeddings for individual codewords, thereby reducing the number of embedding vectors processed by the multimodal machine learning core;

processing the plurality of codewords through a multimodal machine learning core comprising an embedding layer and a cross-modal attention mechanism;

generating a codeword response to the plurality of inputs using the multimodal machine learning core;

translating the codeword response into a translated response which matches one or more modalities of the inputs; and training the multimodal machine learning core simultaneously on the multiple modalities using a joint loss function that applies uncertainty weighting to automatically balance training contributions from the different modalities within the multimodal machine learning core.

14. The method of claim 13, wherein the multimodal machine learning core has a transformer-based machine learning architecture.

15. The method of claim 13, wherein the multimodal machine learning core has a variational autoencoder-based machine learning architecture.

16. The method of claim 13, wherein the multimodal machine learning core has a recurrent neural network-based machine learning architecture.

17. The method of claim 13, further comprising using a plurality of unified codebooks and a plurality of multimodal machine learning cores, wherein each unified codebook and multimodal machine learning core is configured to process inputs of different modalities.

18. The method of claim 17, further comprising translating codewords between any plurality of modalities using a codeword translator.

19. The method of claim 13, wherein the embedding layer is a unified embedding layer that maps codewords from all modalities using a single set of learned embedding parameters.

20. The method of claim 13, wherein the plurality of inputs comprises at least two of:

text data, image data, audio data, and video data.

21. The method of claim 13, wherein the multimodal machine learning core comprises a cross-modal attention mechanism capable of attending to information across different modalities.

22. The method of claim 13, further comprising using modality-specific processing channels that feed into a fusion layer, the fusion layer combining outputs from the modality specific processing channels into the unified representation.

23. The method of claim 13, further comprising performing transfer learning between different modalities using the unified codeword representation.

24. The method of claim 13, further comprising generating outputs in multiple modalities based on a single codeword response.

* * * * *